United States Patent
Karaki et al.

(10) Patent No.: US 12,316,455 B2
(45) Date of Patent: May 27, 2025

(54) CONFIGURED GRANT UPLINK CONTROL INFORMATION (UCI) MAPPING RULES

(71) Applicant: Telefonaktiebolaget LM Ericsson (publ), Stockholm (SE)

(72) Inventors: Reem Karaki, Aachen (DE); Sorour Falahati, Stockholm (SE); Jung-Fu Cheng, Fremont, CA (US); Havish Koorapaty, Saratoga, CA (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 440 days.

(21) Appl. No.: 17/605,413

(22) PCT Filed: Apr. 30, 2020

(86) PCT No.: PCT/SE2020/050433
§ 371 (c)(1),
(2) Date: Oct. 21, 2021

(87) PCT Pub. No.: WO2020/226549
PCT Pub. Date: Nov. 12, 2020

(65) Prior Publication Data
US 2022/0200734 A1   Jun. 23, 2022

Related U.S. Application Data

(60) Provisional application No. 62/843,121, filed on May 3, 2019.

(51) Int. Cl.
*H04L 1/16* (2023.01)
*H04L 1/1607* (2023.01)
(Continued)

(52) U.S. Cl.
CPC .......... *H04L 1/1671* (2013.01); *H04L 1/1864* (2013.01); *H04L 5/0055* (2013.01)

(58) Field of Classification Search
CPC ... H04L 1/1671; H04L 1/1864; H04L 5/0055; H04L 1/1664; H04L 5/0053; H04L 1/1861
See application file for complete search history.

(56) References Cited

U.S. PATENT DOCUMENTS

| | | | |
|---|---|---|---|
| 11,658,789 B2 * | 5/2023 | Myung | H04W 74/0808 370/329 |
| 2011/0249578 A1 | 10/2011 | Nayeb Nazar et al. | |
| 2022/0053552 A1 * | 2/2022 | Li | H04W 72/542 |

FOREIGN PATENT DOCUMENTS

| | | |
|---|---|---|
| CN | 102893548 A | 1/2013 |
| RU | 2522307 C1 | 7/2014 |
| WO | 2015120807 A2 | 8/2015 |

OTHER PUBLICATIONS

International Search Report and Written Opinion dated Jul. 21, 2020 for International Application No. PCT/SE2020/050433 filed Apr. 30, 2020, consisting of 15 pages.

(Continued)

*Primary Examiner* — Hashim S Bhatti
(74) *Attorney, Agent, or Firm* — Weisberg I.P. Law, P.A.

(57) ABSTRACT

A method and apparatus are disclosed for configured grant uplink control information (UCI) mapping rules. In one embodiment, a network node is configured to transmit downlink control information for a configured grant physical uplink shared channel, CG-PUSCH; and receive configured grant uplink control information, CG-UCI, on the CG-PUSCH, the CG-UCI being mapped to the CG-PUSCH based at least in part on a presence of at least one Hybrid Automatic Repeat reQuest-acknowledgement, HARQ-ACK. In another embodiment, a wireless device is configured to receive, from the network node, downlink control information for a configured grant physical uplink shared channel, CG-PUSCH; and transmit a configured grant (Continued)

uplink control information, CG-UCI, on the CG-PUSCH, the CG-UCI being mapped to the CG-PUSCH based at least in part on a presence of at least one Hybrid Automatic Repeat reQuest-acknowledgement, HARQ-ACK.

22 Claims, 10 Drawing Sheets

(51) Int. Cl.
*H04L 1/1829* (2023.01)
*H04L 5/00* (2006.01)

(56) References Cited

OTHER PUBLICATIONS

3GPP TSG RAN WG1 #97 R1-1906133; Title: Discussion on the enhancements to configured grants; Source: vivo: Agenda Item: 7.2.2.2.4; Document for: Discussion and Decision; Date and Location: May 13-17, 2019 and Reno, USA; consisting of 10 pages.

3GPP TSG-RAN Meeting #105bis R2-1904666; Title: Intra-UE prioritization: Role of PHY in prioritization; Agenda Item: 11.7.3; Source: Qualcomm Incorporated; Document for: Discussion; Date and Location: Apr. 8-12, 2019 and Xi'an, China; consisting of 28 pages.

Chinese Office Action and English translation dated Sep. 9, 2023 for Application No. 202080033117.3, consisting of 18 pages.

Russian Office Action and English Translation dated Jun. 29, 2022 for Application No. 2021135262/07, consisting of 12 pages.

3GPP TSG RAN WG1 #97 R1-1906151; Title: Enhanced UL configured grant transmissions for URLLC; Source: vivo; Agenda Item: 7.2.6.6; Document for: Discussion and Decision; Location and Date: Reno, USA, May 13-17, 2019, consisting of 7 pages.

3GPP TSG RAN WG1 Meeting #96bis R1-1904068; Title: Discussion on the enhancements to configured grants; Source: vivo; Agenda Item: 7.2.2.2.4; Document for: Discussion and Decision; Location and Date: Xi'an, China, Apr. 8-12, 2019, consisting of 6 pages.

* cited by examiner

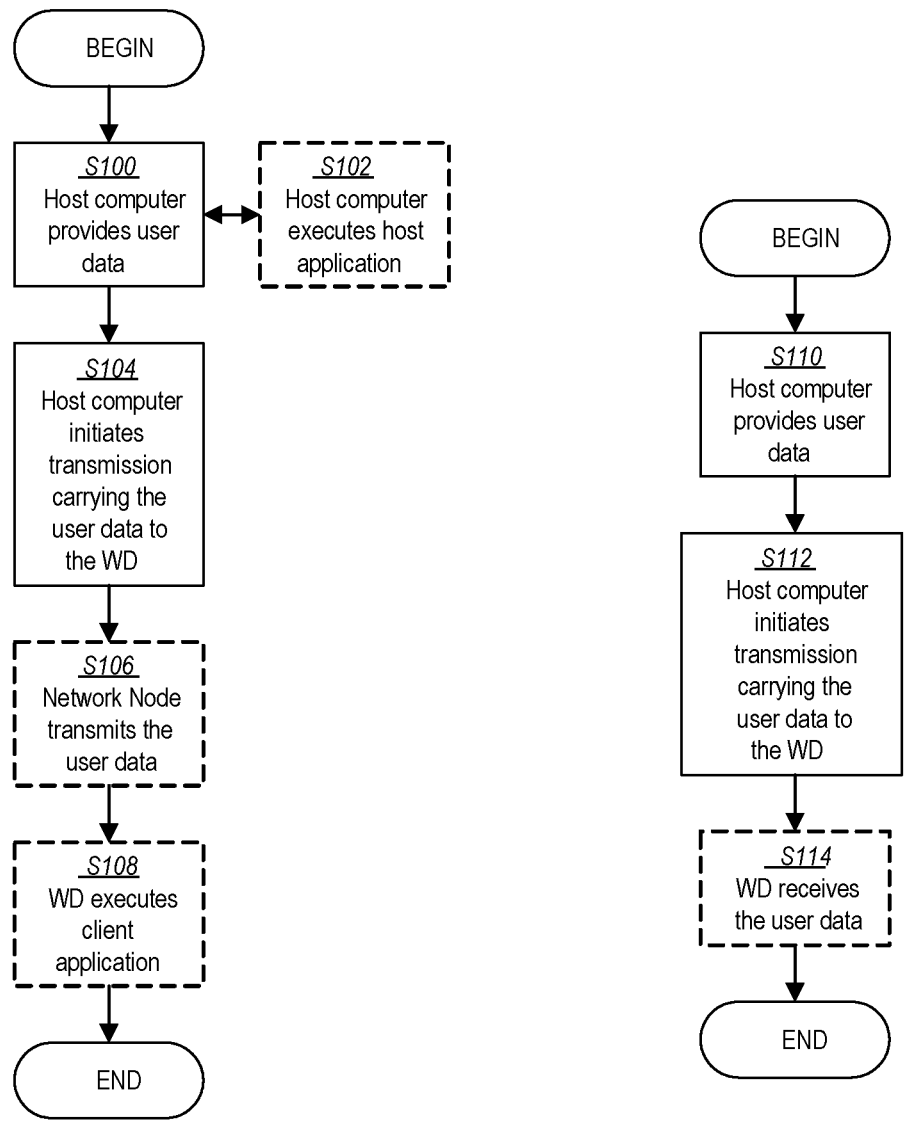

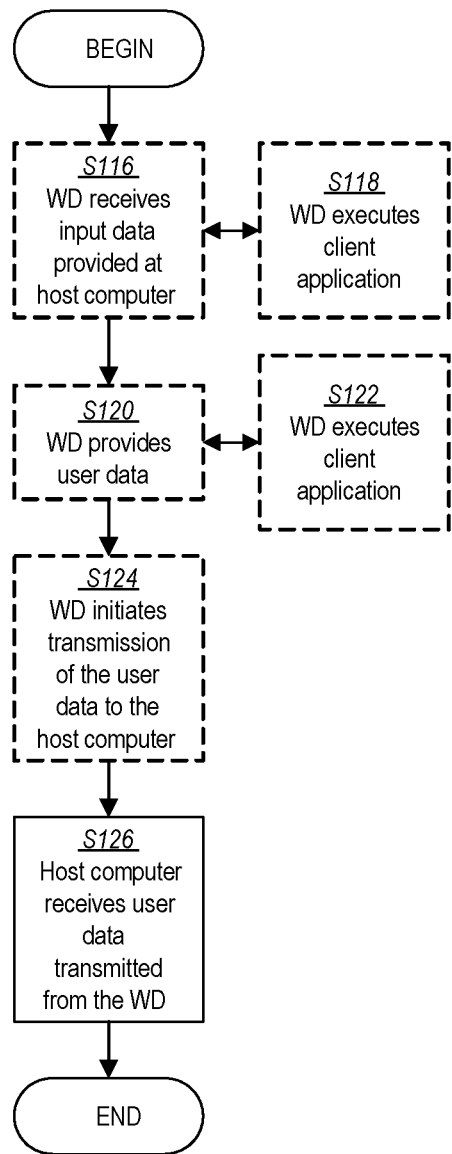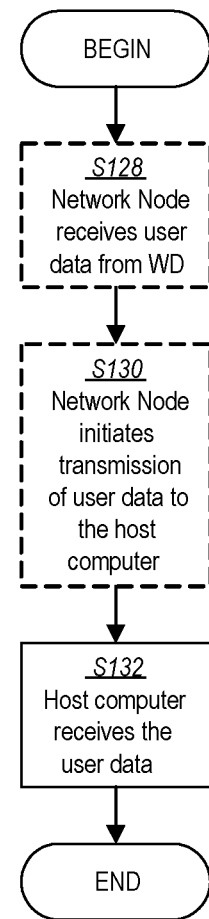
FIG. 9
FIG. 10

CONFIGURED GRANT UPLINK CONTROL INFORMATION (UCI) MAPPING RULES

CROSS-REFERENCE TO RELATED APPLICATIONS

This application is a Submission Under 35 U.S.C. § 371 for U.S. National Stage Patent Application of International Application No.: PCT/SE2020/050433, filed Apr. 30, 2020 entitled "CONFIGURED GRANT UPLINK CONTROL INFORMATION (UCI) MAPPING RULES," which claims priority to U.S. Provisional Application No. 62/843,121, filed May 3, 2019, entitled "CONFIGURED UL UCI MAPPING RULES," the entireties of both of which are incorporated herein by reference.

TECHNICAL FIELD

The present disclosure relates to wireless communications, and in particular, to configured grant uplink control information (UCI) mapping rules.

BACKGROUND

The New Radio (NR) (also referred to as "5G") standard in the Third Generation Partnership Project (3GPP) is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR in addition to transmission in a slot, a mini-slot transmission is also allowed to reduce latency. A mini-slot may consist of any number of 1 to 14 orthogonal frequency division multiplexing (OFDM) symbols. It should be noted that the concepts of slot and mini-slot are not specific to a specific service meaning that a mini-slot may be used for either eMBB, URLLC, or other services.

Resource Blocks

In 3GPP Release 15 (Rel-15) NR, a wireless device (WD) (e.g., user equipment (UE)) can be configured with up to four carrier bandwidth parts (BWPs) in the downlink with a single downlink carrier bandwidth part being active at a given time. A WD can be configured with up to four carrier bandwidth parts in the uplink with a single uplink carrier bandwidth part being active at a given time. If a WD is configured with a supplementary uplink, the WD can in addition be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N_{BWP,i}^{size}-1$, where i is the index of the carrier bandwidth part. A resource block (RB) is defined as 12 consecutive subcarriers in the frequency domain.

Numerologies

Multiple OFDM numerologies, $\mu$, are supported in NR, for example as given by Table 1, where the subcarrier spacing, $\Delta f$, and the cyclic prefix for a carrier bandwidth part are configured by different higher layer parameters for downlink and uplink, respectively.

TABLE 1

Supported transmission numerologies.

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Physical Channels

A downlink physical channel corresponds to a set of resource elements carrying information originating from higher layers. The following are examples of downlink physical channels:

Physical Downlink Shared Channel, PDSCH
Physical Broadcast Channel, PBCH
Physical Downlink Control Channel, PDCCH PDSCH is the main physical channel used for unicast downlink data transmission, but also for transmission of RAR (random access response), certain system information blocks, and paging information. PBCH carries the basic system information used by the WD to access the network. PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. The following are examples of uplink physical channels:

Physical Uplink Shared Channel, PUSCH
Physical Uplink Control Channel, PUCCH
Physical Random Access Channel, PRACH PUSCH is the uplink counterpart to the PDSCH. PUCCH is used by WDs to transmit uplink control information, including Hybrid Automatic Repeat reQuest (HARD) acknowledgements, channel state information (CSI) reports, etc. PRACH is used for random access preamble transmission.

Frequency Resource Allocation for PUSCH and PDSCH

In general, a WD may determine the resource block (RB) assignment in frequency domain for PUSCH or PDSCH using the resource allocation field in the detected DCI carried in PDCCH. For PUSCH carrying msg3 in a random-access procedure, the frequency domain resource assignment is signaled by using the UL grant contained in RAR.

In NR, two frequency resource allocation schemes, Type 0 and Type 1, are supported for PUSCH and PDSCH. Which type to use for a PUSCH/PDSCH transmission is either defined by a radio resource control (RRC) configured parameter or indicated directly in the corresponding DCI or UL grant in RAR (for which type 1 is used).

The RB indexing for uplink/downlink Type 0 and Type 1 resource allocation is determined within the WD's active carrier bandwidth part, and the WD may upon detection of PDCCH intended for the WD determine first the uplink/downlink carrier bandwidth part and then the resource allocation within the carrier bandwidth part. The UL BWP for PUSCH carrying msg3 is configured by higher layer parameters.

Cell Search and Initial Access Related Channels and Signals

For cell search and initial access, these channels are included: synchronization signal/physical broadcast channel (SS/PBCH) block, PDSCH carrying RMSI/RAR/MSG4 scheduled by PDCCH channels carrying DCI, PRACH channels and PUSCH channel carrying MSG3. Synchronization signal and PBCH block (SS/PBCH block, or SSB in shorter format) includes the above signals (primary synchronization signal (PSS), secondary synchronization signal (SSS) and PBCH demodulation reference signal (DMRS)), and PBCH. SSB may have 15 kilohertz (kHz), 30 kHz, 120 kHz or 240 kHz subcarrier spacing (SCS) depending on the frequency range.

PDCCH Monitoring

In the 3GPP NR standard, downlink control information (DCI) is received over the physical layer downlink control channel (PDCCH). The PDCCH may carry DCI in messages with different formats. DCI format 0_0 and 0_1 are DCI messages used to convey uplink grants to the WD for transmission of the physical layer data channel in the uplink (PUSCH) and DCI format 1_0 and 1_1 are used to convey downlink grants for transmission of the physical layer data channel on the downlink (PDSCH). Other DCI formats (2_0, 2_1, 2_2 and 2_3) are used for other purposes such as transmission of slot format information, reserved resource, transmit power control information, etc.

A PDCCH candidate may be searched within a common or WD-specific search space which is mapped to a set of time and frequency resources referred to as a control resource set (CORESET). The search spaces within which PDCCH candidates must be monitored are configured to the WD via radio resource control (RRC) signaling. A monitoring periodicity is also configured for different PDCCH candidates. In any particular slot the WD may be configured to monitor multiple PDCCH candidates in multiple search spaces which may be mapped to one or more CORESETs. PDCCH candidates may be monitored multiple times in a slot, once every slot or once every multiple slots.

The smallest unit used for defining CORESETs is a Resource Element Group (REG) which is defined as spanning 1 PRB×1 OFDM symbol in frequency and time. Each REG contains demodulation reference signals (DM-RS) to aid in the estimation of the radio channel over which that REG was transmitted. When transmitting the PDCCH, a precoder could be used to apply weights at the transmit antennas based on some knowledge of the radio channel prior to transmission. It is possible to improve channel estimation performance at the WD by estimating the channel over multiple REGs that are proximate in time and frequency if the precoder used at the transmitter for the REGs is not different. To assist the WD with channel estimation the multiple REGs can be grouped together to form a REG bundle and the REG bundle size for a CORESET is indicated to the WD. The WD may assume that any precoder used for the transmission of the PDCCH is the same for all the REGs in the REG bundle. A REG bundle may include 2, 3 or 6 REGs.

A control channel element (CCE) includes 6 REGs. The REGs within a CCE may either be contiguous or distributed in frequency. When the REGs are distributed in frequency, the CORESET is said to be using an interleaved mapping of REGs to a CCE and if the REGs are not distributed in frequency, a non-interleaved mapping is said to be used.

Interleaving can provide frequency diversity. Not using interleaving is beneficial for cases where knowledge of the channel allows the use of a precoder in a particular part of the spectrum improve the signal-to-noise ratio (SINR) at the receiver.

A PDCCH candidate may span 1, 2, 4, 8 or 16 CCEs. If more than one CCE is used, the information in the first CCE is repeated in the other CCEs. Therefore, the number of aggregated CCEs used is referred to as the aggregation level for the PDCCH candidate.

A hashing function may be used to determine the CCEs corresponding to PDCCH candidates that a WD is to monitor within a search space set. The hashing is performed differently for different WDs so that the CCEs used by the WDs are randomized and the probability of collisions between multiple WDs for which PDCCH messages are included in a CORESET can be reduced.

Slot Structure

An NR slot includes several OFDM symbols, according to current agreements either 7 or 14 symbols (OFDM subcarrier spacing≤60 kHz) and 14 symbols (OFDM subcarrier spacing>60 kHz). FIG. 1 shows an example of a subframe with 14 OFDM symbols. In FIG. 2, an example slot structure is shown, where $T_s$ and $T_{symb}$ denote the slot and OFDM symbol duration, respectively. In addition, a slot may also be shortened to accommodate a DL/UL transient period, or both DL and UL transmissions. Potential variations of slot structures are illustrated in FIG. 3, for example.

Furthermore, NR also defines Type B scheduling, also known as mini-slots. Mini-slots are shorter than slots (according to current agreements from 1 or 2 symbols up to number of symbols in a slot minus one) and can start at any symbol. Mini-slots are used, for example, if the transmission duration of a slot is too long or the occurrence of the next slot start (slot alignment) is too late. Applications of mini-slots include among others latency critical transmissions (in this case both mini-slot length and frequent opportunity of mini-slot are useful) and unlicensed spectrum where a transmission should start immediately after a listen-before-talk procedure succeeds (here the frequent opportunity of mini-slot is especially useful). An example of mini-slots is shown in FIG. 4, with 2 OFDM symbols.

Configured UL

NR supports two types of pre-configured resources. Both of which are different flavors of existing Long Term Evolution (LTE) semi-persistent scheduling with some further aspects such as supporting repetitions for a transport block (TB).

Type 1, UL data transmission with configured grant (CG) is only based on RRC (re)configuration without any L1 signaling.

Type 2 is very similar to LTE Semi-persistent Scheduling (SPS) feature. UL data transmission with configured grant (CG) is based on both RRC configuration and L1 signaling for activation/deactivation of the grant. The network node (e.g., gNB) explicitly activates the configured resources on PDCCH and the WD confirms the reception of the activation/deactivation grant with a Medium Access Control (MAC) control element.

Repetition of a TB is also supported in NR, and the same resource configuration is used for K repetitions for a TB including the initial transmission. The possible values of K are {1, 2, 4, 8}. Repetitions follow a redundancy version (RV) sequence configured by WD-specific RRC signaling to one of the following: Sequence {0, 2, 3, 1} or {0, 3, 0, 3} or {0, 0, 0, 0}.

Operation in Unlicensed Spectrum

For a node to be allowed to transmit in unlicensed spectrum, e.g. the 5 GHz band, the node typically performs a clear channel assessment (CCA). This procedure typically includes sensing the medium to be idle for a number of time intervals. Sensing the medium to be idle can be performed in different ways, e.g. using energy detection, preamble detection or using virtual carrier sensing. Use of the latter implies that the node reads control information from other transmitting nodes informing when a transmission ends. After sensing the medium idle a node is typically allowed to transmit for a certain amount of time, sometimes referred to as transmission opportunity (TXOP). The length of the TXOP depends on regulation and type of CCA that has been performed, but typically ranges from 1 millisecond (ms) to 10 ms.

The mini-slot concept in NR allows a node to access the channel at a much finer granularity compared to e.g., LTE license assisted access (LAA), where the channel could only be accessed at 500 us intervals. Using for example 60 kHz subcarrier-spacing and a two symbol mini-slot in NR, the channel can be accessed at 36 us intervals.

However, existing arrangements do not provide for efficient use of configured uplink.

SUMMARY

Some embodiments advantageously provide methods and apparatuses for configured grant uplink control information (UCI) mapping rules.

In one embodiment, a network node is configured to optionally, cause the radio interface to transmit a configured grant for a physical uplink shared channel (CG-PUSCH); and receive a configured grant uplink control information (CG-UCI) message on the CG-PUSCH according to at least one predetermined mapping rule.

In another embodiment, a wireless device is configured to optionally, receive a configured grant for a physical uplink shared channel (CG-PUSCH); and cause the radio interface to transmit a configured grant uplink control information (CG-UCI) message on the CG-PUSCH according to at least one predetermined mapping rule.

According to one aspect of the present disclosure, a method implemented in a wireless device is provided. The method includes receiving, from a network node, downlink control information for a configured grant physical uplink shared channel, CG-PUSCH; and transmitting configured grant uplink control information, CG-UCI, on the CG-PUSCH, the CG-UCI being mapped to the CG-PUSCH based at least in part on a presence of at least one Hybrid Automatic Repeat reQuest-acknowledgement, HARQ-ACK.

In some embodiments of this aspect, the downlink control information corresponds to one of a configured grant Type 1 and a configured grant Type 2. In some embodiments of this aspect, the CG-UCI corresponds to uplink control information related to decoding uplink shared channel, UL-SCH, that is transmitted on a configured grant resource corresponding to the CG-PUSCH, and the at least one HARQ-ACK corresponds to at least one acknowledgement/non-acknowledgment for at least one downlink, DL, transmission. In some embodiments of this aspect, the CG-UCI comprises at least one of a Hybrid Automatic Repeat reQuest, HARQ, process identifier, ID, for the CG-PUSCH, a redundancy version, RV, for the CG-PUSCH and a new data indicator, NDI, for the CG-PUSCH.

In some embodiments of this aspect, the method further includes receiving signaling from the network node, the signaling indicating whether or not multiplexing of the CG-UCI on the CG-PUSCH with other uplink control information is allowed. In some embodiments of this aspect, the signaling is received via one of radio resource control, RRC, signaling and physical downlink control channel, PDCCH, signaling. In some embodiments of this aspect, the method further includes if the received signaling indicates that multiplexing is allowed, multiplexing the CG-UCI bits with the other uplink control information bits. In some embodiments of this aspect, the other uplink control information bits include at least one of HARQ-ACK bits and channel state information, CSI, bits. In some embodiments of this aspect, the method further includes when there is the presence of the HARQ-ACK, mapping the CG-UCI, as part of the HARQ-ACK, to the CG-PUSCH. In some embodiments, the downlink control information includes at least one of radio resource control, RRC, signaling and downlink control information, DCI, signaling.

In some embodiments of this aspect, the method further includes when at least one HARQ-ACK is to be transmitted in the CG-PUSCH, mapping the CG-UCI to the CG-PUSCH, as separate from the HARQ-ACK. In some embodiments of this aspect, the method further includes when at least one HARQ-ACK is not to be transmitted in the CG-PUSCH, mapping the CG-UCI to an immediate next orthogonal frequency division multiplexing, OFDM, symbol after a first demodulation reference signal, DMRS, for the CG-PUSCH. In some embodiments of this aspect, the CG-UCI has a same priority as a Hybrid Automatic Repeat reQuest acknowledgement, HARQ-ACK, uplink control information, UCI.

In some embodiments of this aspect, the method further includes determining, $Q'_{CG-UCI}$, a number of coded modulation symbols per layer for a CG-UCI transmission on the CG-PUSCH with an uplink shared channel, UL-SCH, and without the HARQ-ACK according to:

$$Q'_{CG-UCI} = \min\left\{ \left\lceil \frac{(O_{CG-UCI} + L_{CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\},$$

wherein,
$O_{CG-UCI}$ represents a number of bits for the CG-UCI;
$L_{CG-UCI}$ represents a number of cyclic redundancy check, CRC, bits for the CG-UCI;
$\beta_{offset}^{PUSCH}$ represents an offset value that is a same value that is configured for the HARQ-ACK;
$C_{UL-SCH}$ represents a number of code blocks for the UL-SCH;
$K_{r=0}$ or $K_r$ represents an r-th code block size for the UL-SCH of the CG-PUSCH transmission;
$M_{sc}^{PUSCH}$ represents a scheduled bandwidth of the CG-PUSCH transmission, expressed as a number of subcarriers;
$M_{sc}^{PT-RS}(l)$ represents a number of subcarriers in orthogonal frequency division multiplexed, OFDM, symbol l that carries a phase tracking reference signal, PTRS, in the PUSCH transmission;

$M_{sc}^{UCI}(l)$ represents a number of resource elements that can be used for transmission of uplink control information, UCI, in the OFDM symbol l, for l=0, 1, 2, ... $N_{symb,all}^{PUSCH}-1$ in the CG-PUSCH transmission and $N_{symb,all}^{PUSCH}$ is a total number of OFDM symbols of the CG-PUSCH, including all OFDM symbols used for a demodulation reference signal, DMRS;

for any OFDM symbol that carries DMRS of the PUSCH, $M_{sc}^{UCI}(l)=0$;

for any OFDM symbol that does not carry DMRS of the PUSCH, $M_{sc}^{UCI}(l)=M_{sc}^{PUSCH} M_{sc}^{PT-RS}(-l)$;

α is configured by higher layer parameter scaling; and $l_0$ represents a symbol index of a first OFDM symbol that does not carry DMRS of the CG-PUSCH, after first DMRS symbols, in the CG-PUSCH transmission.

In some embodiments of this aspect, the method further includes determining, $Q'_{ACK}$, a number of coded modulation symbols per layer for a HARQ-ACK transmission on the CG-PUSCH with an uplink shared channel, UL-SCH, and with the HARQ-ACK using at least: $O_{ACK}$=a number of bits for the CG-UCI+a number of the HARQ-ACK bits. In some embodiments of this aspect, the method further includes determining, $Q'_{ACK}$, a number of coded modulation symbols per layer for a transmission on the CG-PUSCH with an uplink shared channel, UL-SCH, and without the HARQ-ACK using at least: $O_{ACK}=O_{CG-UCI}$, $O_{CG-UCI}$ representing a number of bits for the CG-UCI.

According to another aspect of the present disclosure, a method implemented by a network node configured to communicate with a wireless device is provided. The method includes transmitting downlink control information for a configured grant physical uplink shared channel, CG-PUSCH. The method includes receiving configured grant uplink control information, CG-UCI, on the CG-PUSCH, the CG-UCI being mapped to the CG-PUSCH based at least in part on a presence of at least one Hybrid Automatic Repeat reQuest-acknowledgement, HARQ-ACK.

In some embodiments of this aspect, the downlink control information corresponds to one of a configured grant Type 1 and a configured grant Type 2. In some embodiments of this aspect, the CG-UCI corresponds to uplink control information related to decoding uplink shared channel, UL-SCH, that is transmitted on a configured grant resource corresponding to the CG-PUSCH, and the at least one HARQ-ACK corresponds to at least one acknowledgement/non-acknowledgment for at least one downlink, DL, transmission. In some embodiments of this aspect, the CG-UCI comprises at least one of a Hybrid Automatic Repeat reQuest, HARQ, process identifier, ID, for the CG-PUSCH, a redundancy version, RV, for the CG-PUSCH and a new data indicator, NDI, for the CG-PUSCH.

In some embodiments of this aspect, the method includes transmitting signaling indicating whether or not multiplexing of the CG-UCI on the CG-PUSCH with other uplink control information is allowed by the wireless device. In some embodiments of this aspect, transmitting the signaling further includes transmitting the signaling via one of radio resource control, RRC, signaling and physical downlink control channel, PDCCH, signaling. In some embodiments of this aspect, receiving the CG-UCI further includes if the transmitted signaling indicates that multiplexing is allowed, receiving the CG-UCI bits as multiplexed with the other uplink control information bits. In some embodiments of this aspect, the other uplink control information bits include at least one of HARQ-ACK bits and channel state information, CSI, bits.

In some embodiments of this aspect, receiving the CG-UCI further includes, when there is the presence of the HARQ-ACK, receiving the CG-UCI on the CG-PUSCH as part of the HARQ-ACK. In some embodiments, the downlink control information includes at least one of radio resource control, RRC, signaling and downlink control information, DCI, signaling. In some embodiments of this aspect, receiving the CG-UCI further includes, when at least one HARQ-ACK is to be transmitted in the CG-PUSCH, receiving the CG-UCI on the CG-PUSCH as separate from the at least one HARQ-ACK. In some embodiments of this aspect, receiving the CG-UCI further includes, when at least one HARQ-ACK is not to be transmitted in the CG-PUSCH, receiving the CG-UCI starting from an immediate next orthogonal frequency division multiplexing, OFDM, symbol after a first demodulation reference signal, DMRS, for the CG-PUSCH. In some embodiments of this aspect, the CG-UCI has a same priority as a Hybrid Automatic Repeat reQuest acknowledgement, HARQ-ACK, uplink control information, UCI.

In some embodiments of this aspect, the method further includes determining, $Q'_{CG-UCI}$, a number of coded modulation symbols per layer for a CG-UCI transmission on the CG-PUSCH with an uplink shared channel, UL-SCH, and without the HARQ-ACK according to:

$$Q'_{CG-UCI} = \min\left\{\left\lceil\frac{(O_{CG-UCI}+L_{CG-UCI})\cdot\beta_{offset}^{PUSCH}\cdot\sum_{l=0}^{N_{symb,all}^{PUSCH}-1}M_{sc}^{UCI}(l)}{\sum_{r=0}^{C_{UL-SCH}-1}K_r}\right\rceil,\left\lceil\alpha\cdot\sum_{l=l_0}^{N_{symb,all}^{PUSCH}-1}M_{sc}^{UCI}(l)\right\rceil\right\},$$

wherein, $O_{CG-UCI}$ represents a number of bits for the CG-UCI;

$L_{CG-UCI}$ represents a number of cyclic redundancy check, CRC, bits for the CG-UCI;

$\beta_{offset}^{PUSCH}$ represents an offset value that is a same value that is configured for the HARQ-ACK;

$C_{UL-SCH}$ represents a number of code blocks for the UL-SCH;

$K_{r=0}$ or $K_r$ represents an r-th code block size for the UL-SCH of the CG-PUSCH transmission;

$M_{sc}^{PUSCH}$ represents a scheduled bandwidth of the CG-PUSCH transmission, expressed as a number of subcarriers;

$M_{sc}^{PT-RS}(l)$ represents a number of subcarriers in orthogonal frequency division multiplexed, OFDM, symbol l that carries a phase tracking reference signal, PTRS, in the PUSCH transmission;

$M_{sc}^{USI}(l)$ represents a number of resource elements that can be used for transmission of uplink control information, UCI, in the OFDM symbol l, for l=0, 1, 2, ..., $N_{symb,all}^{PUSCH}-1$, in the CG-PUSCH transmission and $N_{symb,all}^{PUSCH}$ is a total number of OFDM symbols of the CG-PUSCH, including all OFDM symbols used for a demodulation reference signal, DMRS;

for any OFDM symbol that carries DMRS of the PUSCH, $M_{sc}^{UCI}(i)=0$;

for any OFDM symbol that does not carry DMRS of the PUSCH, $M_{sc}^{UCI}(l)=M_{sc}^{PUSCH} M_{sc}^{PT-RS}(-1)$;

α is configured by higher layer parameter scaling; and $l_0$ represents a symbol index of a first OFDM symbol that does not carry DMRS of the CG-PUSCH, after first DMRS symbols, in the CG-PUSCH transmission.

In some embodiments of this aspect, the method includes determining, $Q'_{ACK}$, a number of coded modulation symbols per layer for a HARQ-ACK transmission on the CG-PUSCH with an uplink shared channel, UL-SCH, and with the HARQ-ACK using at least: $O_{ACK}$=a number of bits for the CG-UCI+a number of the HARQ-ACK bits. In some embodiments of this aspect, the method further includes determining, $Q'_{ACK}$, a number of coded modulation symbols per layer for a transmission on the CG-PUSCH with an uplink shared channel, UL-SCH, and without the HARQ-ACK using at least: $O_{ACK}=O_{CG-UCI}$, $O_{CG-UCI}$ representing a number of bits for the CG-UCI.

According to another aspect of the present disclosure, a wireless device configured to communicate with a network node is provided. The wireless device includes processing circuitry. The processing circuitry is configured to cause the wireless device to receive, from the network node, downlink control information for a configured grant physical uplink shared channel, CG-PUSCH. The processing circuitry is configured to cause the wireless device to transmit configured grant uplink control information, CG-UCI, on the CG-PUSCH, the CG-UCI being mapped to the CG-PUSCH based at least in part on a presence of at least one Hybrid Automatic Repeat reQuest-acknowledgement, HARQ-ACK.

In some embodiments of this aspect, the downlink control information corresponds to one of a configured grant Type 1 and a configured grant Type 2. In some embodiments of this aspect, the CG-UCI corresponds to uplink control information related to decoding uplink shared channel, UL-SCH, that is transmitted on a configured grant resource corresponding to the CG-PUSCH, and the at least one HARQ-ACK corresponds to at least one acknowledgement/non-acknowledgment for at least one downlink, DL, transmission. In some embodiments of this aspect, the CG-UCI comprises at least one of a Hybrid Automatic Repeat reQuest, HARQ, process identifier, ID, for the CG-PUSCH, a redundancy version, RV, for the CG-PUSCH and a new data indicator, NDI, for the CG-PUSCH.

In some embodiments of this aspect, the processing circuitry is further configured to cause the wireless device to receive signaling from the network node, the signaling indicating whether or not multiplexing of the CG-UCI on the CG-PUSCH with other uplink control information is allowed. In some embodiments of this aspect, the processing circuitry is further configured to cause the wireless device to receive the signaling by being configured to cause the wireless device to receive the signaling via one of radio resource control, RRC, signaling and physical downlink control channel, PDCCH, signaling. In some embodiments of this aspect, the processing circuitry is further configured to cause the wireless device to if the received signaling indicates that multiplexing is allowed, multiplex the CG-UCI bits with the other uplink control information bits.

In some embodiments of this aspect, the other uplink control information bits include at least one of HARQ-ACK bits and channel state information, CSI, bits. In some embodiments of this aspect, the processing circuitry is further configured to cause the wireless device to, when there is the presence of the HARQ-ACK, map the CG-UCI, as part of the HARQ-ACK, to the CG-PUSCH. In some embodiments, the downlink control information includes at least one of radio resource control, RRC, signaling and downlink control information, DCI, signaling. In some embodiments of this aspect, the processing circuitry is further configured to cause the wireless device to, when at least one HARQ-ACK is to be transmitted in the CG-PUSCH, map the CG-UCI to the CG-PUSCH, as separate from the at least one HARQ-ACK. In some embodiments of this aspect, the processing circuitry is further configured to cause the wireless device to, when at least one HARQ-ACK is not to be transmitted in the CG-PUSCH, map the CG-UCI to an immediate next orthogonal frequency division multiplexing, OFDM, symbol after a first demodulation reference signal, DMRS, for the CG-PUSCH. In some embodiments of this aspect, the CG-UCI has a same priority as a Hybrid Automatic Repeat reQuest acknowledgement, HARQ-ACK, uplink control information, UCI.

In some embodiments of this aspect, the processing circuitry is further configured to cause the wireless device to determine, $Q'_{CG-UCI}$, a number of coded modulation symbols per layer for a CG-UCI transmission on the CG-PUSCH with an uplink shared channel, UL-SCH, and without the HARQ-ACK according to:

$$Q'_{CG-UCI} = \min\left\{\left[\frac{(O_{CG-UCI} + L_{CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right],\right.$$

$$\left.\left[\alpha \cdot \sum_{l=l_0}^{N_{symb,all}^{PUSCH}-1} M_{sc}^{UCI}(l)\right]\right\},$$

wherein, $O_{CG-UCI}$ represents a number of bits for the CG-UCI;

$L_{CG-UCI}$ represents a number of cyclic redundancy check, CRC, bits for the CG-UCI;

$\beta_{offset}^{PUSCH}$ represents an offset value that is a same value that is configured for the HARQ-ACK;

$C_{UL-SCH}$ represents a number of code blocks for the UL-SCH;

$K_{r=0}$ or $K_r$ represents an r-th code block size for the UL-SCH of the CG-PUSCH transmission;

$M_{sc}^{PUSCH}$ represents a scheduled bandwidth of the CG-PUSCH transmission, expressed as a number of subcarriers;

$M_{sc}^{PT-RS}(l)$ represents a number of subcarriers in orthogonal frequency division multiplexed, OFDM, symbol l that carries a phase tracking reference signal, PTRS, in the PUSCH transmission;

$M_{sc}^{UCI}(l)$ represents a number of resource elements that can be used for transmission of uplink control information, UCI, in the OFDM symbol l, for l=0, 1, 2, ... $N_{symb,all}^{PUSCH}$−1, in the CG-PUSCH transmission and $N_{symb,all}^{PUSCH}$ is a total number of OFDM symbols of the CG-PUSCH, including all OFDM symbols used for a demodulation reference signal, DMRS;
for any OFDM symbol that carries DMRS of the PUSCH, $M_{sc}^{UCI}(l)=0$;
for any OFDM symbol that does not carry DMRS of the PUSCH, $M_{sc}^{UCI}(l)=M_{sc}^{PUSCH} M_{sc}^{PT-RS}(-l)$;
α is configured by higher layer parameter scaling; and
$l_0$ represents a symbol index of a first OFDM symbol that does not carry DMRS of the CG-PUSCH, after first DMRS symbols, in the CG-PUSCH transmission.

In some embodiments of this aspect, the processing circuitry is further configured to cause the wireless device to determine, $Q'_{ACK}$, a number of coded modulation symbols per layer for a HARQ-ACK transmission on the CG-PUSCH with an uplink shared channel, UL-SCH and with the HARQ-ACK using at least: $O_{ACK}$=a number of bits for the CG-UCI+a number of the HARQ-ACK bits. In some embodiments of this aspect, the processing circuitry is further configured to cause the wireless device to determine, $Q'_{ACK}$, a number of coded modulation symbols per layer for a transmission on the CG-PUSCH with an uplink shared channel, UL-SCH, and without the HARQ-ACK using at least: $O_{ACK}=O_{CG-UCI}$, $O_{CG-UCI}$ representing a number of bits for the CG-UCI.

According to yet another aspect of the present disclosure, a network node configured to communicate with a wireless device is provided. The network node includes processing circuitry. The processing circuitry is configured to cause the network node to transmit downlink control information for a configured grant physical uplink shared channel, CG-PUSCH. The processing circuitry is configured to cause the network node to receive configured grant uplink control information, CG-UCI, on the CG-PUSCH, the CG-UCI being mapped to the CG-PUSCH based at least in part on a presence of at least one Hybrid Automatic Repeat reQuest-acknowledgement, HARQ-ACK.

In some embodiments of this aspect, the downlink control information corresponds to one of a configured grant Type and a configured grant Type 2. In some embodiments of this aspect, the CG-UCI corresponds to uplink control information related to decoding uplink shared channel, UL-SCH, that is transmitted on a configured grant resource corresponding to the CG-PUSCH, and the at least one HARQ-ACK corresponds to at least one acknowledgement/non-acknowledgment for at least one downlink, DL, transmission. In some embodiments of this aspect, the CG-UCI comprises at least one of a Hybrid Automatic Repeat reQuest, HARQ, process identifier, ID, for the CG-PUSCH, a redundancy version, RV, for the CG-PUSCH and a new data indicator, NDI, for the CG-PUSCH. In some embodiments of this aspect, the processing circuitry is further configured to cause the network node to transmit signaling indicating whether or not multiplexing of the CG-UCI on the CG-PUSCH with other uplink control information is allowed by the wireless device.

In some embodiments of this aspect, the processing circuitry is further configured to cause the network node to transmit the signaling by being configured to cause the network node to transmit the signaling via one of radio resource control, RRC, signaling and physical downlink control channel, PDCCH, signaling. In some embodiments of this aspect, the processing circuitry is further configured to cause the network node to receive the CG-UCI by being configured to cause the network node to if the transmitted signaling indicates that multiplexing is allowed, receive the CG-UCI bits as multiplexed with the other uplink control information bits. In some embodiments of this aspect, the other uplink control information bits include at least one of HARQ-ACK bits and channel state information, CSI, bits.

In some embodiments of this aspect, the processing circuitry is further configured to cause the network node to receive the CG-UCI by being configured to cause the network node to, when there is the presence of the HARQ-ACK, receive the CG-UCI on the CG-PUSCH as part of the HARQ-ACK. In some embodiments, the downlink control information includes at least one of radio resource control, RRC, signaling and downlink control information, DCI, signaling. In some embodiments of this aspect, the processing circuitry is further configured to cause the network node to receive the CG-UCI by being configured to cause the network node to, when at least one HARQ-ACK is to be transmitted in the CG-PUSCH, receive the CG-UCI on the CG-PUSCH as separate from the at least one HARQ-ACK. In some embodiments of this aspect, the processing circuitry is further configured to cause the network node to receive the CG-UCI by being configured to cause the network node to, when at least one HARQ-ACK is not to be transmitted in the CG-PUSCH, receive the CG-UCI starting from an immediate next orthogonal frequency division multiplexing, OFDM, symbol after a first demodulation reference signal, DMRS, for the CG-PUSCH. In some embodiments of this aspect, the CG-UCI has a same priority as a Hybrid Automatic Repeat reQuest acknowledgement, HARQ-ACK, uplink control information, UCI.

In some embodiments of this aspect, the processing circuitry is further configured to cause the network node to determine, $Q'_{CG-UCI}$, a number of coded modulation symbols per layer for a CG-UCI transmission on the CG-PUSCH with an uplink shared channel, UL-SCH and without the HARQ-ACK according to:

$$Q'_{CG-UCI} = \min\left\{ \left\lceil \frac{(O_{CG-UCI} + L_{CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\},$$

wherein,
$O_{CG-UCI}$ represents a number of bits for the CG-UCI;
$L_{CG-UCI}$ represents a number of cyclic redundancy check, CRC, bits for the CG-UCI;
$\beta_{offset}^{PUSCH}$ represents an offset value that is a same value that is configured for the HARQ-ACK;
$C_{UL-SCH}$ represents a number of code blocks for the UL-SCH;
$K_{r=0}$ or $K_r$ represents an r-th code block size for the UL-SCH of the CG-PUSCH transmission;
$M_{sc}^{PUSCH}$ represents a scheduled bandwidth of the CG-PUSCH transmission, expressed as a number of subcarriers;
$M_{sc}^{PT-RS}(l)$ represents a number of subcarriers in orthogonal frequency division multiplexed, OFDM, symbol that carries a phase tracking reference signal, PTRS, in the PUSCH transmission;

$M_{sc}^{UCI}(l)$ represents a number of resource elements that can be used for transmission of uplink control information, UCI, in the OFDM symbol l, for l=0, 1, 2, ... $N_{symb,all}^{PUSCH}$−1, in the CG-PUSCH transmission and $N_{symb,all}^{PUSCH}$ is a total number of OFDM symbols of the CG-PUSCH, including all OFDM symbols used for a demodulation reference signal, DMRS; for any OFDM symbol that carries DMRS of the PUSCH, $M_{sc}^{UCI}(l)$=0;

for any OFDM symbol that does not carry DMRS of the PUSCH, $M_{sc}^{UCI}(l)=M_{sc}^{PUSCH} M_{sc}^{PT-RS}(-1)$;

α is configured by higher layer parameter scaling; and $l_0$ represents a symbol index of a first OFDM symbol that does not carry DMRS of the CG-PUSCH, after first DMRS symbols, in the CG-PUSCH transmission.

In some embodiments of this aspect, the processing circuitry is further configured to cause the network node to determine, $Q'_{ACK}$, a number of coded modulation symbols per layer for a HARK-ACK transmission on the CG-PUSCH with an uplink shared channel, UL-SCH and with the HARQ-ACK using at least: $O_{ACK}$=a number of bits for the CG-UCI+a number of the HARQ-ACK bits. In some embodiments of this aspect, the processing circuitry is further configured to cause the network node to determine, $Q'_{ACK}$, a number of coded modulation symbols per layer for a transmission on the CG-PUSCH with an uplink shared channel, UL-SCH, and without the HARQ-ACK using at least: $O_{ACK}=O_{CG-UCI}$, $O_{CS-UCI}$ representing a number of bits for the CG-UCI.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart illustrating exemplary methods implemented in a communication system including a host computer, a network node and a wireless device for executing a client application at a wireless device according to some embodiments of the present disclosure;

FIG. 8 is a flowchart illustrating exemplary methods implemented in a communication system including a host computer, a network node and a wireless device for receiving user data at a wireless device according to some embodiments of the present disclosure;

FIG. 9 is a flowchart illustrating exemplary methods implemented in a communication system including a host computer, a network node and a wireless device for receiving user data from the wireless device at a host computer according to some embodiments of the present disclosure;

FIG. 10 is a flowchart illustrating exemplary methods implemented in a communication system including a host computer, a network node and a wireless device for receiving user data at a host computer according to some embodiments of the present disclosure;

DETAILED DESCRIPTION

Figure 1:
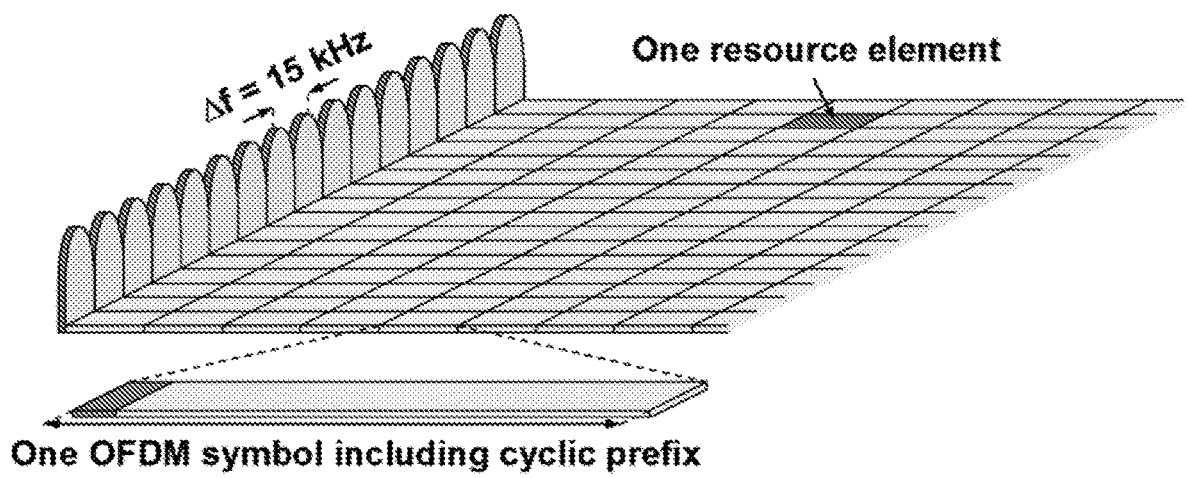
FIG. 1 illustrates an example of radio resource in NR.
Figure 2:
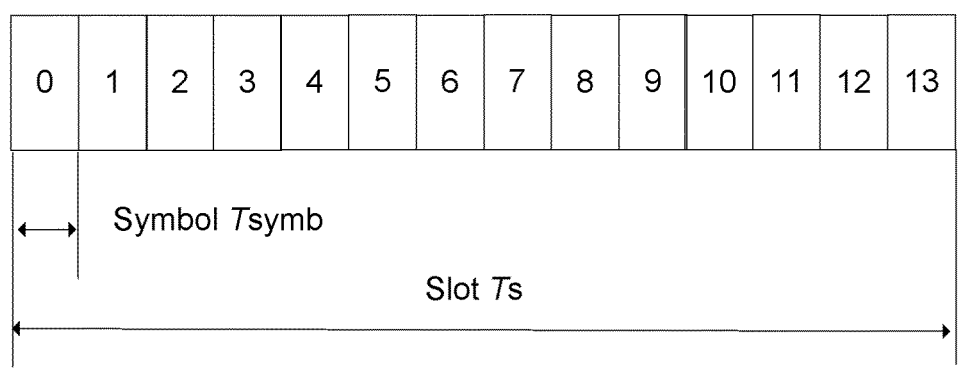
FIG. 2 illustrates an example slot structure.
Figure 3:
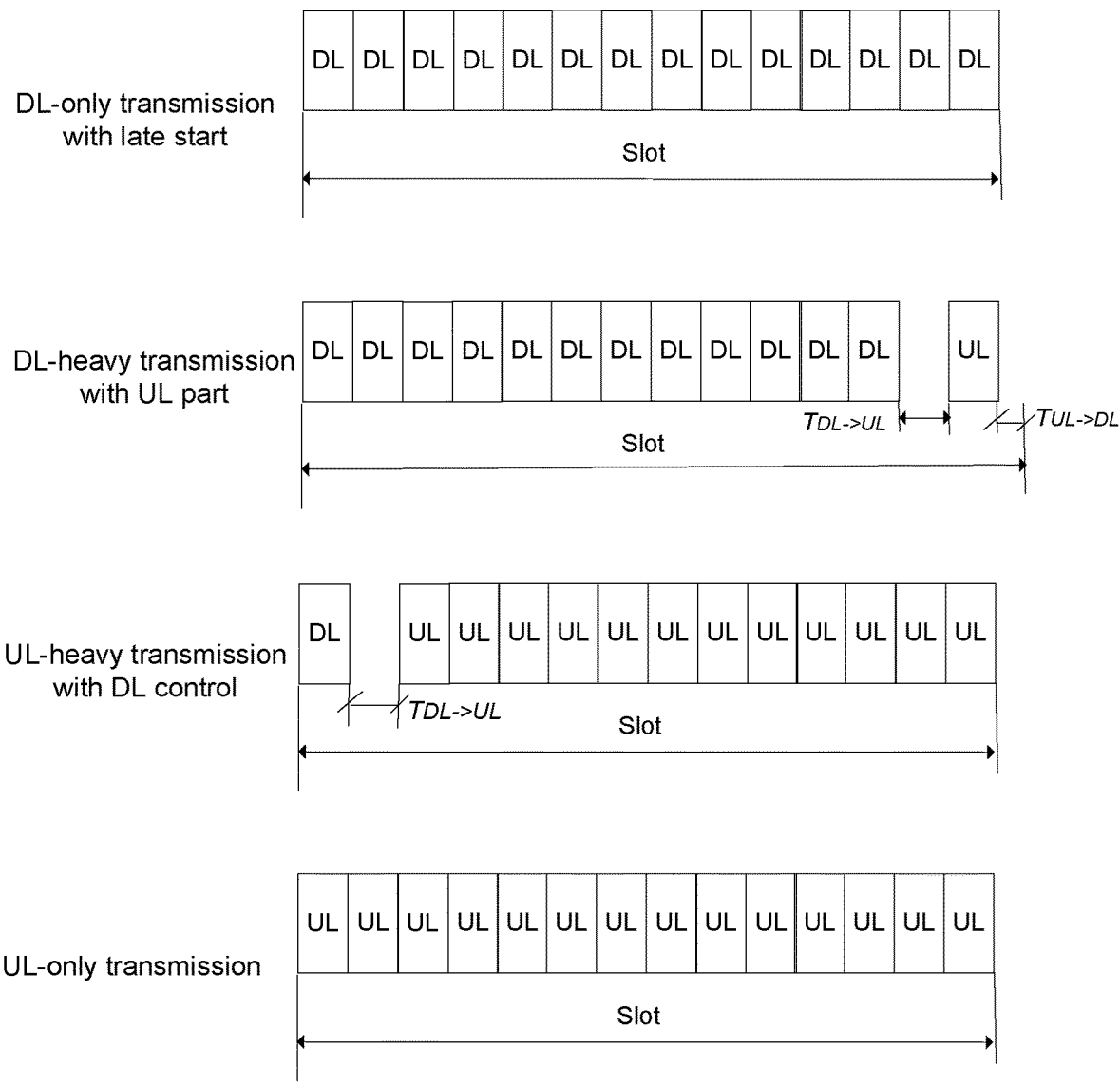
FIG. 3 illustrates examples variations of slot structures in NR.
Figure 4:
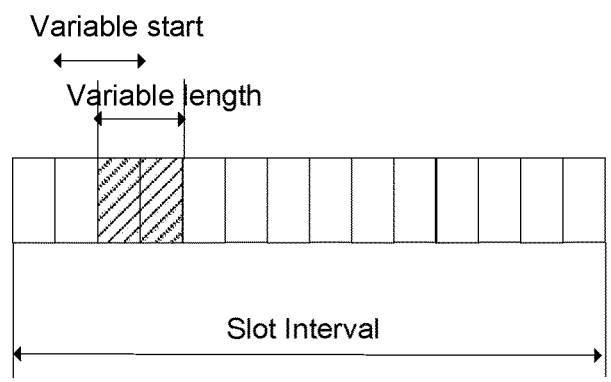
FIG. 4 illustrates an example of a mini-slot with 2 orthogonal frequency division multiplexing (OFDM) symbols.

Some embodiments of the present disclosure describe that wireless networks, such as NR and/or NR-unlicensed (NR-U) be designed support a new UCI for configured UL on every CG-PUSCH. Current arrangements do not define any rules for this. Examples of rules for mapping this UCI, which may be called CG-UCI, are defined and/or discussed herein.

Some embodiments of the present disclosure describe mapping and/or multiplexing rules of the UCI on a CG-PUSCH.

Some embodiments of the present disclosure define mapping and/or multiplexing rules to be followed by the WD for mapping the UCI (which may provide information related to the transmitted CG-PUSCH, such as e.g., HARQ process identity, redundancy version and/or new data indicator for the CG-PUSCH) referred to as CG-UCI, on a CG-PUSCH.

Before describing in detail exemplary embodiments, it is noted that the embodiments reside primarily in combinations of apparatus components and processing steps related to configured grant uplink control information (UCI) mapping rules. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof. In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "downlink control information" is used, which may include RRC signaling (e.g., an RRC parameter) and/or DCI signaling (e.g., a field in a DCI message transmitted on a downlink control channel).

In some embodiments, the terms "mapping" and "multiplexing" are used herein interchangeably.

In some embodiments, the term mapping may be understood according to the following. A physical channel is a channel of a physical layer that transmits a modulation symbol obtained by modulating at least one coded bit stream. A transmitter (e.g., WD) and a receiver (e.g., network node) may previously agree on one or more rules (e.g., predetermined rules) for how to determine resources (e.g., configured grant resources) for which the transmitter and receiver will arrange a physical channel (e.g., CG-PUSCH) during transmission of signals (e.g., CG-UCI, HARQ-ACK, DMRS, CSI, etc. signals) via the resources, and this rule may be called 'mapping'.

In some embodiments, the "presence of a HARQ-ACK" may be considered to mean that there is a HARQ-ACK for the WD to indicate an acknowledgement/non-acknowledgement of a previous downlink transmission from the network node and which HARQ-ACK is to be sent on configured grant resource on the CG-PUSCH. In some embodiments, such presence or absence of such HARQ-ACK may affect and/or determine how the WD and network node understand the mapping of CG-UCI to the CG-PUSCH, as described in more detail herein below. For example, if there is a HARQ-ACK to transmit on CG-PUSCH along with CG-UCI, the WD and network node may use a first mapping rule, while if HARQ-ACK is absent (i.e., there is no HARQ-ACK to transmit on CG-PUSCH), the WD and network node may use another mapping rule(s) to determining where and/or how the CG-UCI is to be mapped and/or multiplexed to the CG-PUSCH.

In some embodiments, such mapping/multiplexing may be performed by e.g., rate matching coded CG-UCI (and coded HARQ-ACK bits in some embodiments) to CG-PUSCH according to one or more rules, as described in more detail below. For example, in some embodiments, CG-UCI may be mapped "as part of" the HARQ-ACK by jointly encoding CG-UCI and HARQ-ACK before rate matching the jointly coded CG-UCI and HARQ-ACK bits to the CG-PUSCH configured grant resources. In some embodiments, CG-UCI may be mapped "as separate from" the HARQ-ACK by separately encoding CG-UCI and HARQ-ACK bits and the separately coded CG-UCI bits and HARQ-ACK bits may be rate matched to the CG-PUSCH configured grant resources.

In some embodiments, the term "configured grant" (also called grant-free scheduling) is used to indicate signaling to the UE/WD that it is allowed to use configured grant resources. In other words, the term "configured grant" may indicate that the network node (e.g., base station) reserves/pre-configures radio resources for UL transmissions and informs the WDs of the reserved resources (e.g., via RRC and in some cases, additionally DCI). When a WD wants to initiate an UL transmission (e.g., CG-PUSCH transmission on the configured grant resources), the WD directly utilizes the reserved configured grant resources, without for example sending a scheduling request (SR) and waiting for the subsequent grant message from the network node before sending the UL transmission.

In some embodiments, the term "receiving" is interchangeably with the term "obtaining". In some embodiments, it may be considered that receiving information (e.g., CG-UCI and/or HARQ-ACK and/or other information that is mapped/multiplexed to CG-PUSCH) may include demodulating, rate-dematching and decoding the information. In some embodiments, it may be considered that transmitting information (e.g., CG-UCI and/or HARQ-ACK and/or other information that is mapped/multiplexed to CG-PUSCH) may include coding, rate matching and modulating the information.

In some embodiments, the CG-UCI having a same priority as a HARQ-ACK UCI implies that the coded CG-UCI is mapped to the CG-PUSCH based on a same procedure for mapping coded HARQ-ACK to the CG-PUSCH. In some embodiments, for the case of jointly encoding the HARQ-ACK information and CG-UCI, they may have a same priority. In some embodiments, for the case of CG-UCI being multiplexed with CSI, the CG-UCI may be mapped before CSI, similar to e.g., how HARQ is multiplexed with CSI.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements.

Although the explanation is described in terms of CG-PUSCH and CG-UCI, the principles may be applicable to other types of channels and signals, or to generally the same channel or signal, but in which the name has been changed in a different standards version.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 5:
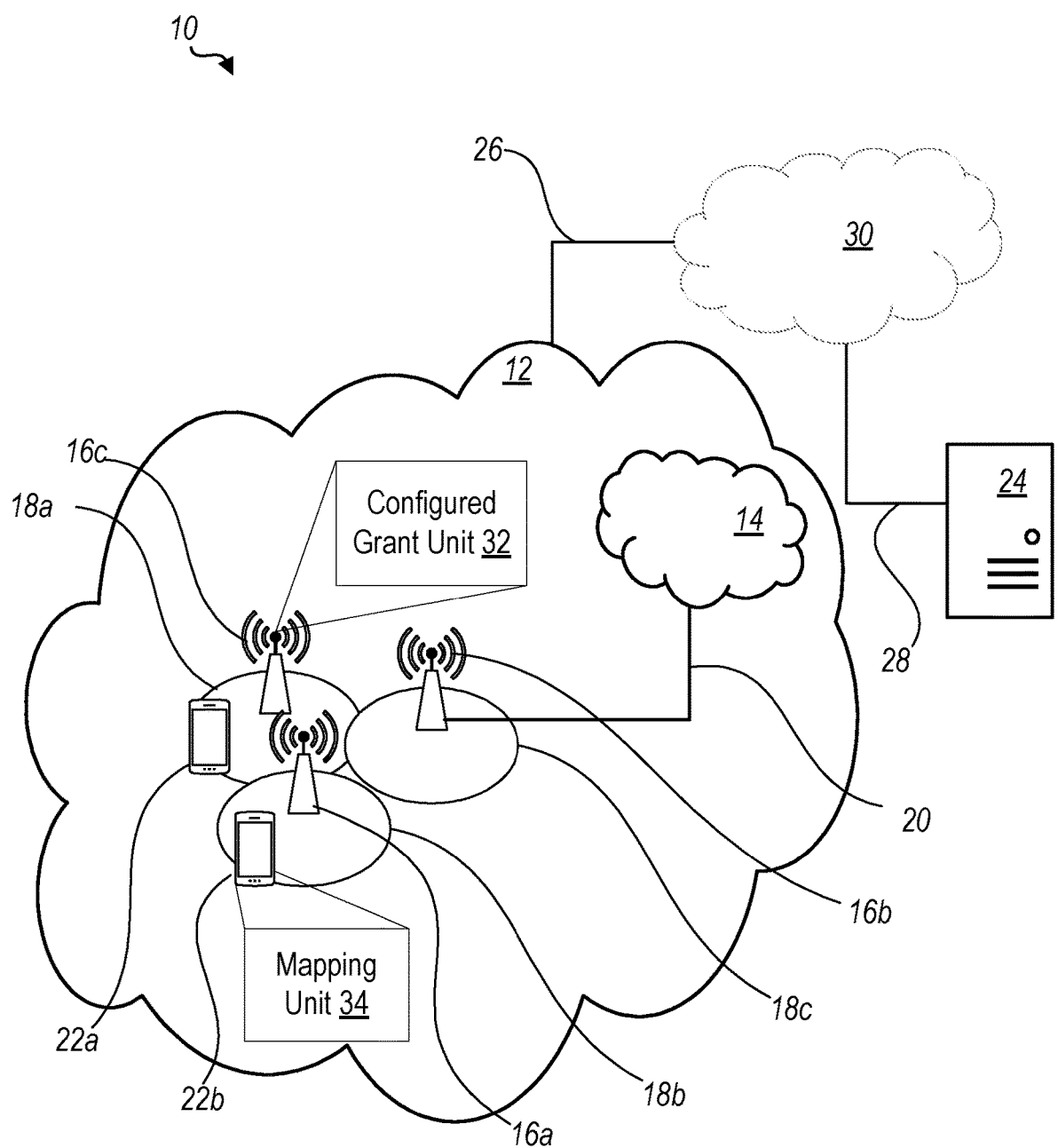
FIG. 5 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 5 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm.

The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown). Further, it is understood that embodiments do not require the inclusion of the host computer 24 and connection 28. In other words, that the concepts and functions described are not limited to the implementation that include an over-the-top (OTT) solution.

The communication system of FIG. 5 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a configured grant unit 32 which is configured to transmit a configured grant for a configured grant physical uplink shared channel, CG-PUSCH; and receive a configured grant uplink control information, CG-UCI, on the CG-PUSCH, the CG-UCI being mapped to the CG-PUSCH based at least in part on a presence of a Hybrid Automatic Repeat reQuest-acknowledgement, HARQ-ACK. In some embodiments, network node 16 is configured to include a configured grant unit 32 which is configured to optionally, cause the radio interface to transmit a configured grant for a physical uplink shared channel (CG-PUSCH); and receive a configured grant uplink control information (CG-UCI) message on the CG-PUSCH according to at least one predetermined mapping rule.

A wireless device 22 is configured to include a mapping unit 34 which is configured to receive, from the network node 16, a configured grant for a configured grant physical uplink shared channel, CG-PUSCH; and transmit a configured grant uplink control information, CG-UCI, on the CG-PUSCH, the CG-UCI being mapped to the CG-PUSCH based at least in part on a presence of a Hybrid Automatic Repeat reQuest-acknowledgement, HARQ-ACK. In some embodiments, wireless device 22 is configured to include a mapping unit 34 which is configured to optionally, receive a configured grant for a physical uplink shared channel (CG-PUSCH); and cause the radio interface to transmit a configured grant uplink control information (CG-UCI) message on the CG-PUSCH according to at least one predetermined mapping rule.

Example implementations, in accordance with an embodiment, of the WD 22, network node 16 and host computer 24 discussed in the preceding paragraphs will now be described with reference to FIG. 6. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configured grant unit 32 configured to optionally, cause the radio interface 62 to transmit a configured grant for a physical uplink shared channel (CG-PUSCH); and receive a configured grant uplink control information (CG-UCI) message on the CG-PUSCH according to at least one predetermined mapping rule.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a mapping unit 34 configured to optionally, receive a configured grant for a physical uplink shared channel (CG-PUSCH); and cause the radio interface 82 to transmit a configured grant uplink control information (CG-UCI) message on the CG-PUSCH according to at least one predetermined mapping rule.

Figure 6:
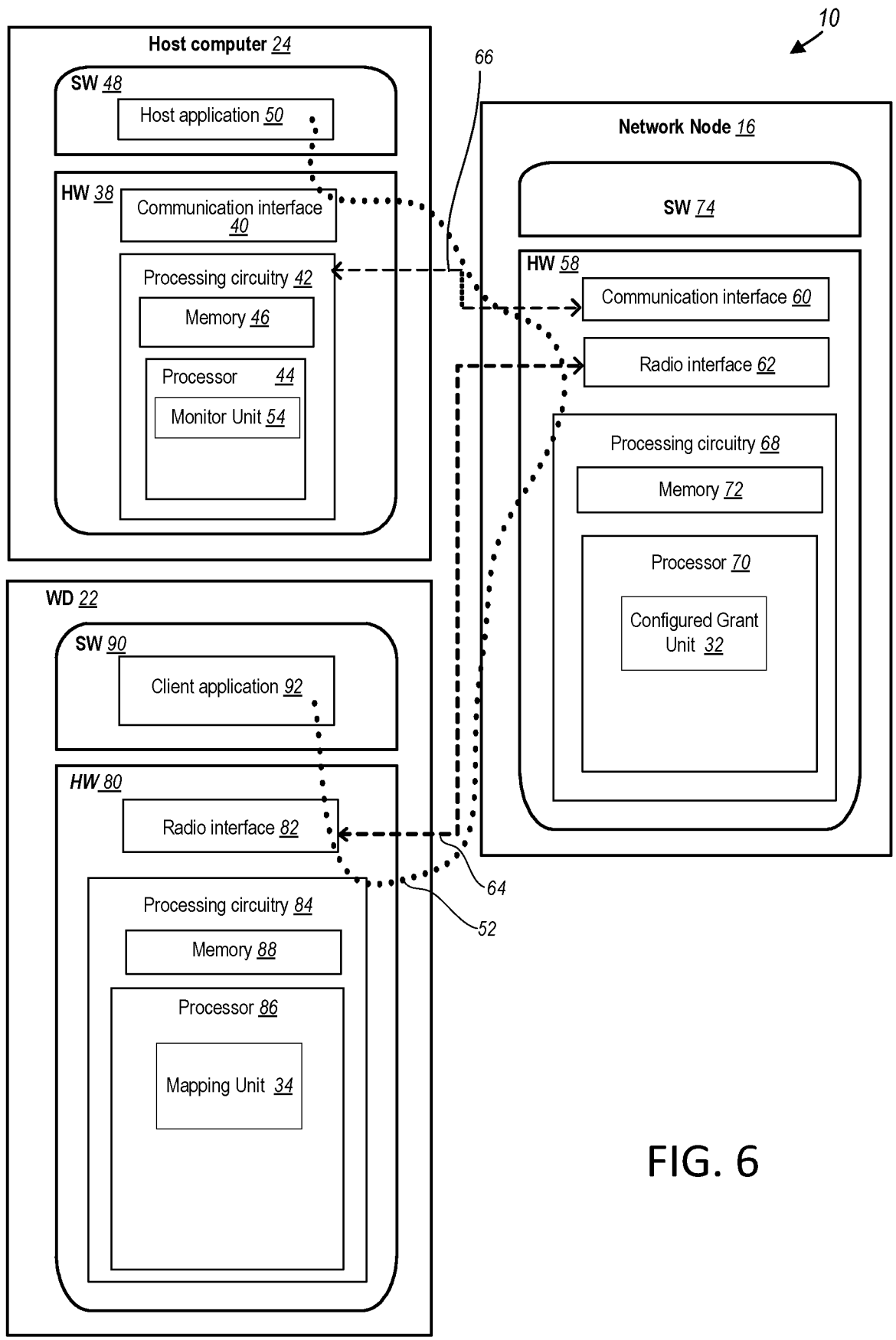
FIG. 6 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 6 and independently, the surrounding network topology may be that of FIG. 5.

In FIG. 6, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 5 and 6 show various "units" such as CG unit 32, and mapping unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 7 is a flowchart illustrating an exemplary method implemented in a communication system, such as, for example, the communication system of FIGS. 5 and 6, in accordance with one embodiment. The communication system may include a host computer 24, a network node 16 and a WD 22, which may be those described with reference to FIG. 6. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 8 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 9 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 10 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 11:
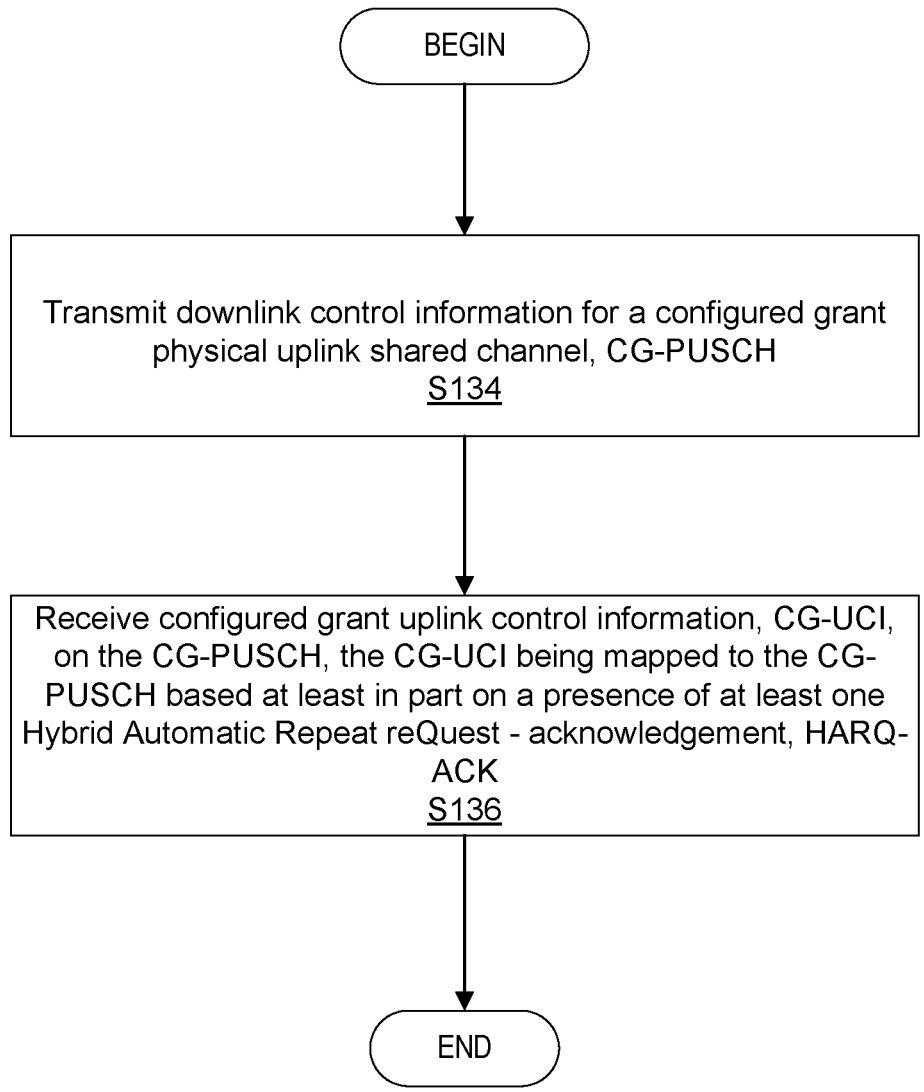
FIG. 11 is a flowchart of an exemplary process in a network node for configured grant unit according to some embodiments of the present disclosure.

FIG. 11 is a flowchart of an exemplary process in a network node 16 for configured grant uplink control information (UCI) mapping rules according to some embodiments of the present disclosure. One or more Blocks and/or functions and/or methods performed by the network node 16 may be performed by one or more elements of network node 16 such as by CG unit 32 in processing circuitry 68, processor 70, communication interface 60, radio interface 62, etc. according to the example method. The example method includes transmitting (Block S134), such as via CG unit 32, processing circuitry 68, processor 70, communication interface 60 and/or radio interface 62, downlink control information for a configured grant physical uplink shared channel, CG-PUSCH. The method includes receiving (Block S136), such as via CG unit 32, processing circuitry 68, processor 70, communication interface 60 and/or radio interface 62, configured grant uplink control information, CG-UCI, on the CG-PUSCH, the CG-UCI being mapped to the CG-PUSCH based at least in part on a presence of at least one Hybrid Automatic Repeat reQuest-acknowledgement, HARQ-ACK.

In some embodiments, the downlink control information corresponds to one of a configured grant Type 1 and a configured grant Type 2. In some embodiments, the CG-UCI corresponds to uplink control information related to decoding uplink shared channel, UL-SCH, that is transmitted on a configured grant resource corresponding to the CG-PUSCH, and the at least one HARQ-ACK corresponds to at least one acknowledgement/non-acknowledgment for at least downlink, DL, transmission. In some embodiments, the CG-UCI comprises at least one of a Hybrid Automatic Repeat reQuest, HARQ, process identifier, ID, for the CG-PUSCH, a redundancy version, RV, for the CG-PUSCH and a new data indicator, NDI, for the CG-PUSCH. In some embodiments, the method further includes transmitting, such as via CG unit 32, processing circuitry 68, processor 70, communication interface 60 and/or radio interface 62, signaling indicating whether or not multiplexing of the CG-UCI on the CG-PUSCH with other uplink control information is allowed by the wireless device 22.

In some embodiments, transmitting, such as via CG unit 32, processing circuitry 68, processor 70, communication interface 60 and/or radio interface 62, the signaling further includes transmitting the signaling via one of radio resource control, RRC, signaling and physical downlink control channel, PDCCH, signaling. In some embodiments, receiving the CG-UCI further includes if the transmitted signaling indicates that the multiplexing is allowed, receiving, such as via CG unit 32, processing circuitry 68, processor 70, communication interface 60 and/or radio interface 62, the CG-UCI bits as multiplexed with the other uplink control information bits. In some embodiments, the other uplink control information bits include at least one of HARQ-ACK bits and channel state information, CSI, bits.

In some embodiments, receiving the CG-UCI further includes, when there is the presence of the HARQ-ACK, receiving, such as via CG unit 32, processing circuitry 68, processor 70, communication interface 60 and/or radio interface 62, the CG-UCI on the CG-PUSCH as part of the HARQ-ACK. In some embodiments, the downlink control information includes at least one of radio resource control, RRC, signaling and downlink control information, DCI, signaling. In some embodiments, receiving the CG-UCI further includes, when at least one HARQ-ACK is to be transmitted in the CG-PUSCH, receiving, such as via CG unit 32, processing circuitry 68, processor 70, communication interface 60 and/or radio interface 62, the CG-UCI on the CG-PUSCH as separate from the at least one HARQ-ACK. In some embodiments, receiving the CG-UCI further includes, when at least one HARQ-ACK is not to be transmitted in the CG-PUSCH, receiving, such as via CG unit 32, processing circuitry 68, processor 70, communication interface 60 and/or radio interface 62, the CG-UCI starting from an immediate next orthogonal frequency division multiplexing, OFDM, symbol after a first demodulation reference signal, DMRS, for the CG-PUSCH. In some embodiments, the CG-UCI has a same priority as a Hybrid Automatic Repeat reQuest acknowledgement, HARQ-ACK, uplink control information, UCI.

In some embodiments, the method further includes determining, such as via CG unit 32, processing circuitry 68, processor 70, communication interface 60 and/or radio interface 62, $Q'_{CG-UCP}$ a number of coded modulation symbols per layer for a CG-UCI transmission on the CG-PUSCH with an uplink shared channel, UL-SCH, and without the HARQ-ACK according to:

$$Q'_{CG-UCI} = \min\left\{\left[\frac{(O_{CG-UCI} + L_{CG-UCI}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r}\right],\right.$$

$$\left.\left[\alpha \cdot \sum_{l=l_0}^{N^{PUSCH}_{symb,all}-1} M^{UCI}_{sc}(l)\right]\right\},$$

wherein, $O_{CG-UCI}$ represents a number of bits for the CG-UCI;

$L_{CG-UCI}$ represents a number of cyclic redundancy check, CRC, bits for the CG-UCI;

$\beta^{PUSCH}_{offset}$ represents an offset value that is a same value that is configured for the HARQ-ACK;

$C_{UL-SCH}$ represents a number of code blocks for the UL-SCH;

$K_{r=0}$ or $K_r$ represents an r-th code block size for the UL-SCH of the CG-PUSCH transmission;

$M^{PUSCH}_{sc}$ represents a scheduled bandwidth of the CG-PUSCH transmission, expressed as a number of subcarriers;

$M^{PT-RS}_{sc}(l)$ represents a number of subcarriers in orthogonal frequency division multiplexed, OFDM, symbol l that carries a phase tracking reference signal, PTRS, in the PUSCH transmission;

$M^{UCI}_{sc}(l)$ represents a number of resource elements that can be used for transmission of uplink control information, UCI, in the OFDM symbol l, for l=0, 1, 2, ..., $N^{PUSCH}_{symb,all}-1$, in the CG-PUSCH transmission and $N^{PUSCH}_{symb,all}$ is a total number of OFDM symbols of the CG-PUSCH, including all OFDM symbols used for a demodulation reference signal, DMRS; for any OFDM symbol that carries DMRS of the PUSCH, $M^{UCI}_{sc}(l)=0$, for any OFDM symbol that does not carry DMRS of the PUSCH, $M^{UCI}_{sc}(l)=M^{PUSCH}_{sc} M^{PT-RS}_{sc}(-l)$;

α is configured by higher layer parameter scaling; and $l_0$ represents a symbol index of a first OFDM symbol that does not carry DMRS of the CG-PUSCH, after first DMRS symbols, in the CG-PUSCH transmission.

In some embodiments, the method further includes determining, such as via CG unit 32, processing circuitry 68, processor 70, communication interface 60 and/or radio interface 62, $Q'_{ACK}$, a number of coded modulation symbols per layer for a HARQ-ACK transmission on the CG-PUSCH with an uplink shared channel, UL-SCH, and with the HARQ-ACK using at least: $O_{ACK}=$a number of bits for the CG-UCI+a number of the HARQ-ACK bits. In some embodiments, the method further includes determining, such as via CG unit 32, processing circuitry 68, processor 70, communication interface 60 and/or radio interface 62, $Q'_{ACK}$, a number of coded modulation symbols per layer for a transmission on the CG-PUSCH with an uplink shared channel, UL-SCH, and without the HARQ-ACK using at least: $O_{ACK}=O_{CG-UCI}$, $O_{CG-UCI}$ representing a number of bits for the CG-UCI.

In some embodiments, the method includes optionally, transmitting, such as via CG unit 32 in processing circuitry 68, processor 70, radio interface 62, a configured grant for a physical uplink shared channel (CG-PUSCH). The method includes receiving, such as via CG unit 32 in processing circuitry 68, processor 70, radio interface 62, a configured grant uplink control information (CG-UCI) message on the CG-PUSCH according to at least one predetermined mapping rule.

In some embodiments, the method includes receiving, such as via CG unit 32 in processing circuitry 68, processor 70, radio interface 62, a rate matched CG-UCI, the CG-UCI starting from an immediate next symbol after a demodulation reference signal (DMRS) for the CG-PUSCH. In some embodiments, the method includes transmitting, such as via CG unit 32 in processing circuitry 68, processor 70, radio interface 62, in indication of whether the CG-PUSCH is allowed to at least partially overlaps with a physical uplink control channel (PUCCH). In some embodiments, the at least one predetermined rule includes if the CG-PUSCH at least partially overlaps with the PUCCH, uplink control information for the PUCCH is mapped into the CG-PUSCH. In some embodiments, the at least one predetermined rule includes if the CG-PUSCH at least partially overlaps with the PUCCH, Hybrid Automatic Repeat reQuest bits for the PUCCH are mapped into the CG-PUSCH. In some embodiments, the at least one predetermined rule includes calculation of a number of coded modulation symbols per layer for the CG-UCI message independent of a length of the CG-PUSCH. In some embodiments, the CG-UCI comprises at least one of a Hybrid Automatic Repeat reQuest (HARQ) process identifier (ID) for the CG-PUSCH, a redundancy version (RV) and a new data indicator (NDI) for the CG-PUSCH.

Figure 12:
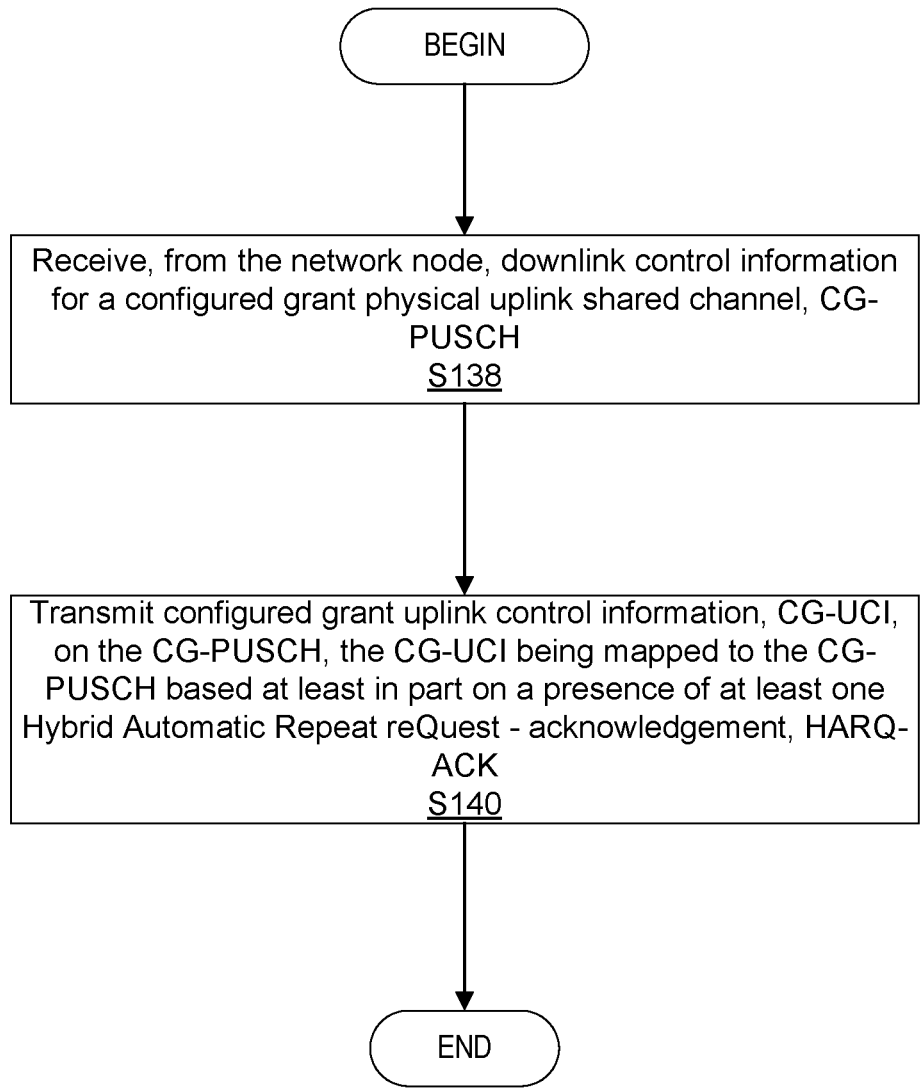
FIG. 12 is a flowchart of an exemplary process in a wireless device for mapping unit according to some embodiments of the present disclosure.

FIG. 12 is a flowchart of an exemplary process in a wireless device 22 for configured grant uplink control information (UCI) mapping rules according to some embodiments of the present disclosure. One or more Blocks and/or functions and/or methods performed by WD 22 may be performed by one or more elements of WD 22 such as by mapping unit 34 in processing circuitry 84, processor 86, radio interface 82, etc. The example method includes receiving (Block S138), such as via mapping unit 34, processing circuitry 84, processor 86 and/or radio interface 82, from a network node 16, downlink control information for a configured grant physical uplink shared channel, CG-PUSCH. The method includes transmitting (Block S140), such as via mapping unit 34, processing circuitry 84, processor 86 and/or radio interface 82, configured grant uplink control information, CG-UCI, on the CG-PUSCH, the CG-UCI being mapped to the CG-PUSCH based at least in part on a presence of at least one Hybrid Automatic Repeat reQuest-acknowledgement, HARQ-ACK.

In some embodiments, the downlink control information corresponds to one of a configured grant Type 1 and a configured grant Type 2. In some embodiments, the CG-UCI corresponds to uplink control information related to decoding uplink shared channel, UL-SCH, that is transmitted on a configured grant resource corresponding to the CG-PUSCH, and the at least one HARQ-ACK corresponds to at least one acknowledgement/non-acknowledgment for at least one downlink, DL, transmission. In some embodiments, the CG-UCI includes at least one of a Hybrid Automatic Repeat reQuest, HARQ, process identifier, ID, for the CG-PUSCH, a redundancy version, RV, for the CG-PUSCH and a new data indicator, NDI, for the CG-PUSCH. In some embodiments, the method further includes receiving, such as via mapping unit 34, processing circuitry 84, processor 86 and/or radio interface 82, signaling from a network node 16, the signaling indicating whether or not multiplexing of the CG-UCI on the CG-PUSCH with other uplink control information is allowed. In some embodiments, the signaling is received via one of radio resource control, RRC, signaling and physical downlink control channel, PDCCH, signaling.

In some embodiments, the method further includes if the received signaling indicates that multiplexing is allowed, multiplexing, such as via mapping unit 34, processing circuitry 84, processor 86 and/or radio interface 82, the CG-UCI bits with the other uplink control information bits. In some embodiments, the other uplink control information bits include at least one of HARQ-ACK bits and channel state information, CSI, bits. In some embodiments, the method further includes, when there is the presence of the HARQ-ACK, mapping, such as via mapping unit 34, processing circuitry 84, processor 86 and/or radio interface 82, the CG-UCI, as part of the HARQ-ACK, to the CG-PUSCH. In some embodiments, the downlink control information includes at least one of radio resource control, RRC, signaling and downlink control information, DCI, signaling. In some embodiments, the method further includes, when at least one HARQ-ACK is to be transmitted in the CG-PUSCH, mapping, such as via mapping unit 34, processing circuitry 84, processor 86 and/or radio interface 82, the CG-UCI to the CG-PUSCH, as separate from the at least one HARQ-ACK. In some embodiments, the method further includes, when at least one HARQ-ACK is not to be transmitted in the CG-PUSCH, mapping, such as via mapping unit 34, processing circuitry 84, processor 86 and/or radio interface 82, the CG-UCI to an immediate next orthogonal frequency division multiplexing, OFDM, symbol after a first demodulation reference signal, DMRS, for the CG-PUSCH. In some embodiments, the CG-UCI has a same priority as a Hybrid Automatic Repeat reQuest acknowledgement, HARQ-ACK, uplink control information, UCI.

In some embodiments, the method further includes determining, such as via mapping unit 34, processing circuitry 84, processor 86 and/or radio interface 82, $Q'_{CG-UCI}$, a number of coded modulation symbols per layer for a CG-UCI transmission on the CG-PUSCH with an uplink shared channel, UL-SCH, and without the HARQ-ACK according to:

$$Q'_{CG-UCI} = \min\left\{\left\lceil\frac{(O_{CG-UCI} + L_{CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left\lceil\alpha \cdot \sum_{l=l_0}^{N_{symb,all}^{PUSCH}-1} M_{sc}^{UCI}(l)\right\rceil\right\},$$

wherein, $O_{CG\text{-}UCI}$ represents a number of bits for the CG-UCI;

$L_{CG\text{-}UCI}$ represents a number of cyclic redundancy check, CRC, bits for the CG-UCI;

$\beta_{offset}^{PUSCH}$ represents an offset value that is a same value that is configured for the HARQ-ACK;

$C_{UL\text{-}SCH}$ represents a number of code blocks for the UL-SCH;

$K_{r=0}$ or $K_r$ represents an r-th code block size for the UL-SCH of the CG-PUSCH transmission;

$M_{sc}^{PUSCH}$ represents a scheduled bandwidth of the CG-PUSCH transmission, expressed as a number of subcarriers;

$M_{sc}^{PT\text{-}RS}(l)$ represents a number of subcarriers in orthogonal frequency division multiplexed, OFDM, symbol l that carries a phase tracking reference signal, PTRS, in the PUSCH transmission;

$M_{sc}^{UCI}(l)$ represents a number of resource elements that can be used for transmission of uplink control information, UCI, in the OFDM symbol l, for l=0, 1, 2 ..., $N_{symb,all}^{PUSCH}-1$, in the CG-PUSCH transmission and is a total number of OFDM symbols of the CG-PUSCH, including all OFDM symbols used for a demodulation reference signal, DMRS;

for any OFDM symbol that carries DMRS of the PUSCH, $M_{sc}^{UCI}(l)=0$;

for any OFDM symbol that does not carry DMRS of the PUSCH, $M_{ss}^{UCI}(l)=M_{sc}^{PUSCH}\, M_{sc}^{PT\text{-}RS}(-l)$;

α is configured by higher layer parameter scaling; and $l_0$ represents a symbol index of a first OFDM symbol that does not carry DMRS of the CG-PUSCH, after first DMRS symbols, in the CG-PUSCH transmission.

In some embodiments, the method further includes determining, such as via mapping unit 34, processing circuitry 84, processor 86 and/or radio interface 82, $Q'_{ACK}$, a number of coded modulation symbols per layer for a HARQ-ACK transmission on the CG-PUSCH with an uplink shared channel, UL-SCH, and with the HARQ-ACK using at least: $O_{ACK}$=a number of bits for the CG-UCI+a number of the HARQ-ACK bits. In some embodiments, the method further includes determining, such as via mapping unit 34, processing circuitry 84, processor 86 and/or radio interface 82, $Q'_{ACK}$, a number of coded modulation symbols per layer for a transmission on the CG-PUSCH with an uplink shared channel, UL-SCH, and without the HARQ-ACK using at least: $O_{ACK}=O_{CG\text{-}UCI}$, $O_{CG\text{-}UCI}$ representing a number of bits for the CG-UCI.

In some embodiments, the method includes optionally, receiving, such as via mapping unit 34, processing circuitry 84, processor 86, radio interface 82, a configured grant for a physical uplink shared channel (CG-PUSCH). The method includes transmitting, such as via mapping unit 34, processing circuitry 84, processor 86, radio interface 82, a configured grant uplink control information (CG-UCI) message on the CG-PUSCH according to at least one predetermined mapping rule.

In some embodiments, the method further includes rate matching, such as via mapping unit 34, processing circuitry 84, processor 86, radio interface 82, CG-UCI by starting from an immediate next symbol after a demodulation reference signal (DMRS) for the CG-PUSCH. In some embodiments, the method further includes determining, such as via mapping unit 34, processing circuitry 84, processor 86, radio interface 82, whether the CG-PUSCH at least partially overlaps with a physical uplink control channel (PUCCH). In some embodiments, the method includes, if the CG-PUSCH at least partially overlaps with the PUCCH, mapping, such as via mapping unit 34, processing circuitry 84, processor 86, radio interface 82, uplink control information for the PUCCH into the CG-PUSCH. In some embodiments, the method includes, if the CG-PUSCH at least partially overlaps with the PUCCH, mapping, such as via mapping unit 34, processing circuitry 84, processor 86, radio interface 82, Hybrid Automatic Repeat reQuest bits for the PUCCH into the CG-PUSCH. In some embodiments, the method includes calculating a number of coded modulation symbols per layer for the CG-UCI message independent of a length of the CG-PUSCH. In some embodiments, the CG-UCI comprises at least one of a Hybrid Automatic Repeat reQuest (HARQ) process identifier (ID) for the PUSCH, a redundancy version (RV) and a new data indicator (NDI) for the PUSCH.

Having described the general process flow of arrangements of the disclosure and having provided examples of hardware and software arrangements for implementing the processes and functions of the disclosure, the sections below provide details, which may be implemented by the network node 16, wireless device 22 and/or host computer 24 and examples of arrangements for configured grant uplink control information (UCI) mapping rules.

As used herein, the non-limiting term CG-UCI refers to uplink control information related to a PUSCH being transmitted (e.g., by radio interface 82) on a configured grant resource, the CG-UCI being used to, for example, receive (e.g., by radio interface 62) the PUSCH successfully. CG-UCI can include at least the HARQ process identifier (ID) chosen by the WD 22 for the PUSCH being transmitted and the associated redundancy version (RV) and new data indicator (NDI).

In some embodiments, CG-UCI is mapped to CG-PUSCH according one or more predetermined mapping rules, which are discussed herein below.

CG-UCI on CG-PUSCH Not Carrying Other Uplink Control Information

Figure 13:
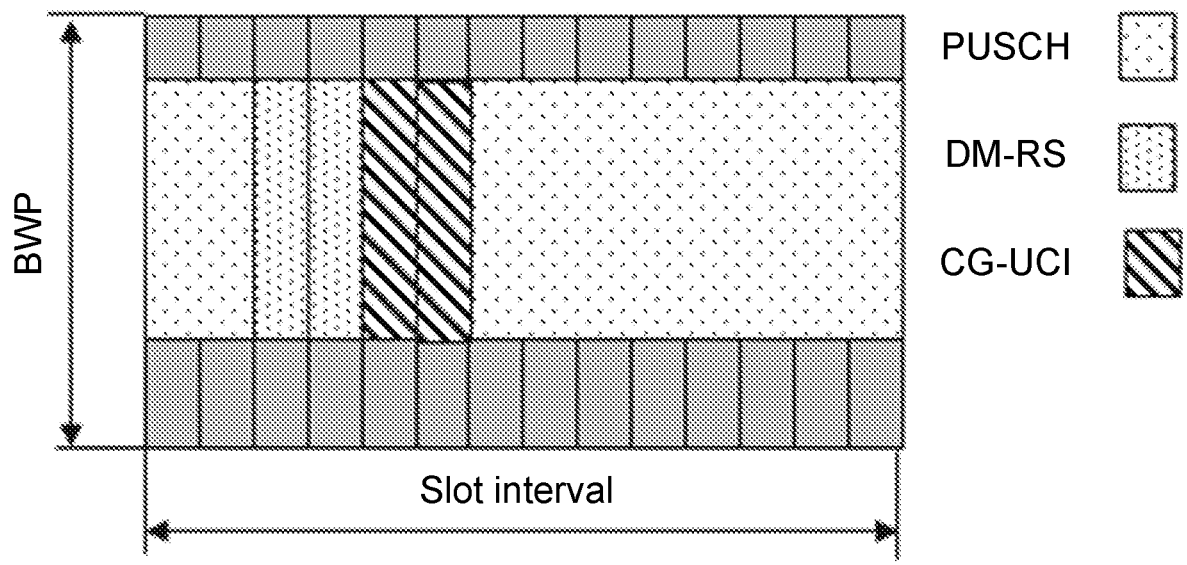
FIG. 13 illustrates an example of rate-matched CG-UCI according to some embodiments of the present disclosure.

UCI may be rate matched (e.g., by processing circuitry 84 of WD 22) starting from the immediate next symbol after the front loaded DMRS symbol(s), as illustrated for example in FIG. 13. It should be understood that, while rate matching is performed by the transmitter (e.g., WD 22 for an UL transmission), the receiver (e.g., network node 16) may also rate match, or more specifically rate-dematch in order to correctly receive the information and both transmitter and receiver may know and/or be pre-configured with the mapping rules in order to transmit and correctly receive the radio signals/transmissions. In one aspect of this embodiment, the CG-UCI is treated with the same priority as HARQ-acknowledgement/non-acknowledgement (ACK) UCI on PUSCH. The same Rel-15 multiplexing rules used for HARQ-ACK UCI may be applied to multiplex the CG-UCI on the CG-PUSCH.

CG-UCI Multiplexing when CG-PUSCH Overlaps with PUCCH

The WD 22, such as via radio interface 82, may be configured via higher layer signalling (e.g., RRC signaling) and may also be dynamically signaled (e.g., via PDCCH) to indicate whether multiplexing of CG-PUSCH with PUCCH is allowed. The information that is to be transmitted (e.g., by WD 22) on PUCCH may include HARQ-ACK information and/or semi-persistent/periodic CSI.

If a WD 22 has a PUSCH transmission that overlaps with a PUCCH transmission that includes HARQ-ACK information and/or semi-persistent/periodic CSI and is allowed by higher layer signaling and potentially dynamic signaling, the WD 22 may multiplex (e.g., via radio interface 82 and/or processing circuitry 84) the uplink control information for the PUCCH transmission (e.g., HARQ-ACK information and/or the semi-persistent/periodic CSI) in the PUSCH.

Since CG-PUSCH may not be understandable without its corresponding UCI (CG-UCI) in e.g., unlicensed NR-U operation, when uplink shared channel (UL-SCH) (e.g., PUSCH) is transmitted on configured grant uplink (CG UL) resources, the WD 22 may ensure that CG-UCI is also transmitted as part of the transmission on the CG UL resources. To guarantee that the multiplexing and dropping rules defined do not lead to the CG-UCI being dropped (e.g., via radio interface 82 and/or processing circuitry 84) when different types of UCI are being prioritized for transmission on limited resources, the CG-UCI may be treated like (e.g., configured with a same priority as) HARQ-ACK for DL transmission according to some embodiments.

In some aspects, if PUCCH includes CSI reports, such CSI reports may be transmitted or not (partially or completely) as per the defined multiplexing rules (e.g., via radio interface 82 and/or processing circuitry 84). This may depend on rate matching, the number of available resources and other parameters.

Figure 14:
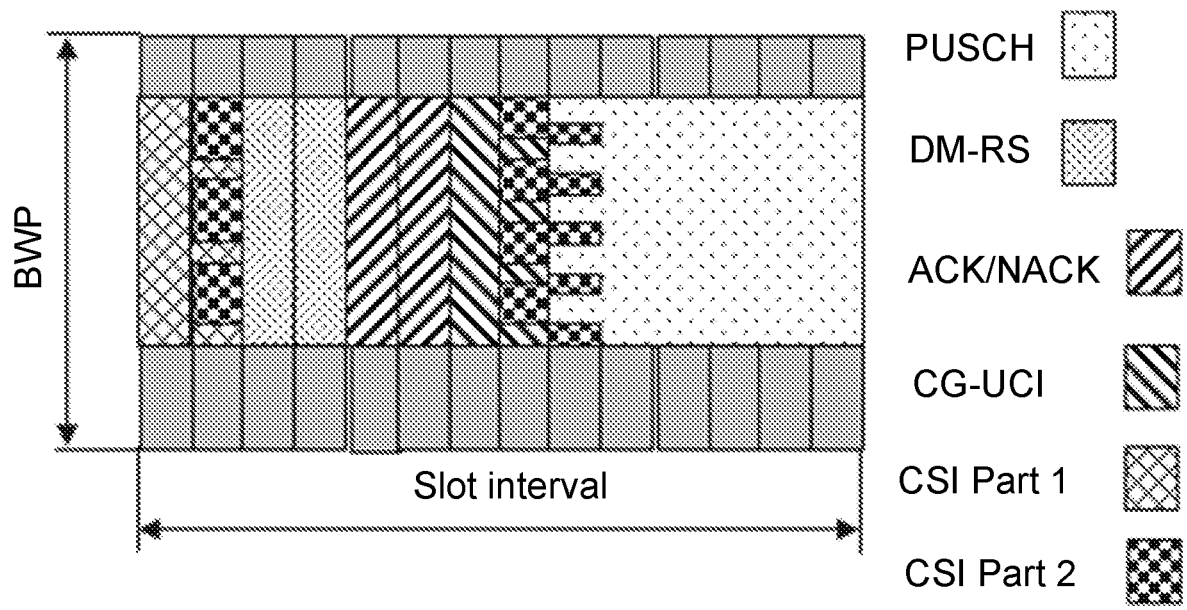
FIG. 14 illustrates an example of CG-UCI bits being mapped to CG-PUSCH as separate from HARQ-ACK bits according to some embodiments of the present disclosure.

In a variation of this embodiment, CG-UCI may be mapped (e.g., via radio interface 82 and/or processing circuitry 84) to PUSCH as illustrated in FIG. 14, for example, and CG-UCI may be considered a separate UCI type from HARQ-ACK UCI; yet both are of the same priority as compared to other UCI-types (CSI part 1 and 2).

Figure 15:
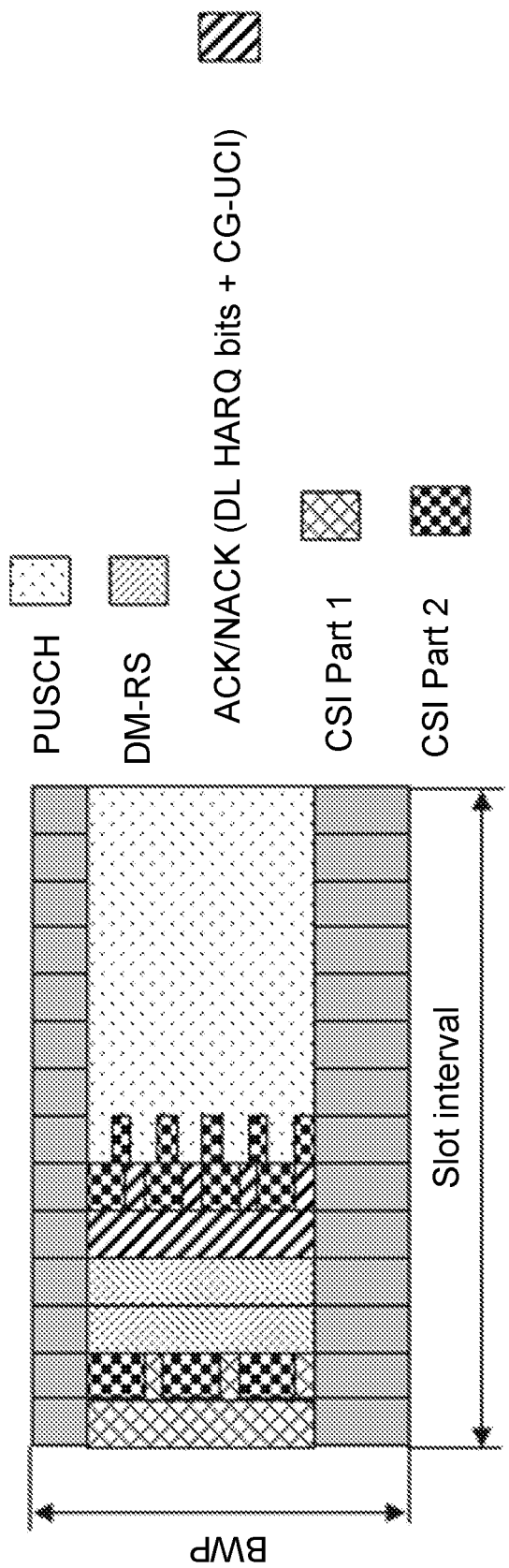
FIG. 15 illustrates an example of CG-UCI bits being mapped to CG-PUSCH as a part of HARQ-ACK according to some embodiments of the present disclosure.

In another variation, the CG-UCI may be mapped (e.g., via radio interface 82 and/or processing circuitry 84) to PUSCH as illustrated in FIG. 15, for example, and CG-UCI may be considered part of HARQ-ACK UCI as described in the first embodiment.

CG-UCI Coded Modulation Symbols

Alternative 1:

For CG-UCI transmission on PUSCH with UL-SCH, the number of coded modulation symbols per layer for CG-UCI transmission, denoted as $Q'_{CG-UCI}$, is determined as follows:

$$Q'_{CG-UCI} = \min \left\{ \left\lceil \frac{(O_{CG-UCI} + L_{CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\}$$

where the parameters in the above equation follow the same definition as in section 6.3.2.4.1.1 in Technical Specification (TS) 38.212 (incorporated herein by reference) except:

$O_{CG-UCI}$: represents the number of bits for the configured grant UCI;

$L_{CG-UCI}$: the number of cyclic redundancy check (CRC) bits for CG-UCI.

The $\beta_{offset}^{PUSCH}$ offset value is the same value that is configured for the HARQ-ACK UCI. As another alternative, a separate offset value is defined for CG-UCI.

$C_{UL-SCH}$ represents a number of code blocks for the UL-SCH;

$K_{r=0}$ or $K_r$ represents an r-th code block size for the UL-SCH of the CG-PUSCH transmission;

$M_{sc}^{PUSCH}$ represents a scheduled bandwidth of the CG-PUSCH transmission, expressed as a number of sub-carriers;

$M_{sc}^{PT-RS}$ represents a number of subcarriers in orthogonal frequency division multiplexed, OFDM, symbol l that carries a phase tracking reference signal, PTRS, in the PUSCH transmission;

$M_{sc}^{UCI}(l)$ represents a number of resource elements that can be used for transmission of uplink control information, UCI, in the OFDM symbol l, for l=0, 1, 2, ..., $N_{symb,all}^{PUSCH}-1$, in the CG-PUSCH transmission and $N_{symb,all}^{PUSCH}$ is a total number of OFDM symbols of the CG-PUSCH, including all OFDM symbols used for a demodulation reference signal, DMRS;

for any OFDM symbol that carries DMRS of the PUSCH, $M_{sc}^{UCI}(l)=0$;

for any OFDM symbol that does not carry DMRS of the PUSCH, $M_{sc}^{UCI}(l)=M_{sc}^{PUSCH} M_{sc}^{PT-RS}(-l)$;

α is configured by higher layer parameter scaling; and $l_0$ represents a symbol index of a first OFDM symbol that does not carry DMRS of the CG-PUSCH, after first DMRS symbols, in the CG-PUSCH transmission.

Alternative 2:

In another embodiment, the CG-UCI is considered part of HARQ-ACK UCI, meaning that HARQ-ACK UCI carries both CG-UCI bits and HARQ-ACK bits.

In case of CG-UCI on CG-PUSCH not carrying HARQ bits, the HARQ-ACK UCI carries only CG-UCI bits. For HARQ-ACK transmission on PUSCH with UL-SCH, the number of coded modulation symbols per layer for HARQ-ACK transmission, denoted as SACK, may be determined, for example, by equation in 6.3.2.4.1.1 in 3GPP Technical Specification (TS) 38.214 (incorporated herein by reference) with:

$O_{ACK}=O_{CG-UCI}$

In the case of CG-UCI on CG-PUSCH carrying HARQ bits, for HARQ-ACK transmission on PUSCH with UL-SCH, the number of coded modulation symbols per layer for HARQ-ACK transmission, denoted as $Q'_{ACK}$, may be determined, for example, by equation in 6.3.2.4.1.1 in TS 38.214 with:

$O_{ACK}$=number of CG-UCI bits+number of HARQ bits

As another aspect of this embodiment (applicable to alternative 1 and 2), the coded symbols may be calculated (e.g., via radio interface 82 and/or processing circuitry 84) according to one or more of the following:

Independent of the actual PUSCH length (in terms of coded blocks or symbols).

$\sum_{l=0}^{N_{symb,all}^{PUSCH}-1} M_{sc}^{UCI}(l)$ is replaced by a constant factor.

Or, assuming PUSCH length equivalent to the duration from the first starting position until the end of the slot. Therefore, the length of UCI is fixed irrespective of the transmission starting position.

The PUSCH length is predefined value. As a non-limiting example, the value can be RRC configured (does not correspond to the actual PUSCH length).

In addition, some embodiments may include one or more of the following:

Embodiment A1. A network node configured to communicate with a wireless device (WD), the network node configured to, and/or comprising a radio interface and/or comprising processing circuitry configured to:

optionally, cause the radio interface to transmit a configured grant for a physical uplink shared channel (CG-PUSCH); and receive a configured grant uplink control information (CG-UCI) message on the CG-PUSCH according to at least one predetermined mapping rule.

Embodiment A2. The network node of Embodiment A1, wherein one or more of:

the processing circuitry is configured to receive a rate matched CG-UCI, the CG-UCI starting from an immediate next symbol after a demodulation reference signal (DMRS) for the CG-PUSCH;

cause the radio interface to transmit in indication of whether the CG-PUSCH is allowed to at least partially overlaps with a physical uplink control channel (PUCCH);

the at least one predetermined rule includes if the CG-PUSCH at least partially overlaps with the PUCCH, uplink control information for the PUCCH is mapped into the CG-PUSCH;

the at least one predetermined rule includes if the CG-PUSCH at least partially overlaps with the PUCCH, Hybrid Automatic Repeat reQuest bits for the PUCCH are mapped into the CG-PUSCH; and the at least one predetermined rule includes calculation of a number of coded modulation symbols per layer for the CG-UCI message independent of a length of the CG-PUSCH.

Embodiment A3. The network node of any one of Embodiments A1 and A2, wherein the CG-UCI comprises at least one of a Hybrid Automatic Repeat reQuest (HARQ) process identifier (ID) for the CG-PUSCH, a redundancy version (RV) and a new data indicator (NDI) for the CG-PUSCH.

Embodiment B1. A method implemented in a network node, the method comprising:

optionally, causing the radio interface to transmit a configured grant for a physical uplink shared channel (CG-PUSCH); and receiving a configured grant uplink control information (CG-UCI) message on the CG-PUSCH according to at least one predetermined mapping rule.

Embodiment B2. The method of Embodiment B1, wherein one or more of:

receiving a rate matched CG-UCI, the CG-UCI starting from an immediate next symbol after a demodulation reference signal (DMRS) for the CG-PUSCH;

transmitting in indication of whether the CG-PUSCH is allowed to at least partially overlaps with a physical uplink control channel (PUCCH);

the at least one predetermined rule includes if the CG-PUSCH at least partially overlaps with the PUCCH, uplink control information for the PUCCH is mapped into the CG-PUSCH;

the at least one predetermined rule includes if the CG-PUSCH at least partially overlaps with the PUCCH, Hybrid Automatic Repeat reQuest bits for the PUCCH are mapped into the CG-PUSCH; and the at least one predetermined rule includes calculation of a number of coded modulation symbols per layer for the CG-UCI message independent of a length of the CG-PUSCH.

Embodiment B3. The method of any one of Embodiments B1 and B2, wherein the CG-UCI comprises at least one of a Hybrid Automatic Repeat reQuest (HARQ) process identifier (ID) for the CG-PUSCH, a redundancy version (RV) and a new data indicator (NDI) for the CG-PUSCH.

Embodiment C1. A wireless device (WD) configured to communicate with a network node, the WD configured to, and/or comprising a radio interface and/or processing circuitry configured to;

optionally, receive a configured grant for a physical uplink shared channel (CG-PUSCH); and cause the radio interface to transmit a configured grant uplink control information (CG-UCI) message on the CG-PUSCH according to at least one predetermined mapping rule.

Embodiment C2. The WD of Embodiment C1, wherein the processing circuitry is configured to one or more of:

rate match CG-UCI by starting from an immediate next symbol after a demodulation reference signal (DMRS) for the CG-PUSCH;

determine whether the CG-PUSCH at least partially overlaps with a physical uplink control channel (PUCCH);

if the CG-PUSCH at least partially overlaps with the PUCCH, map uplink control information for the PUCCH into the CG-PUSCH;

if the CG-PUSCH at least partially overlaps with the PUCCH, map Hybrid Automatic Repeat reQuest bits for the PUCCH into the CG-PUSCH; and calculate a number of coded modulation symbols per layer for the CG-UCI message independent of a length of the CG-PUSCH.

Embodiment C3. The WD of any one of Embodiments C1 and C2, wherein the CG-UCI comprises at least one of a Hybrid Automatic Repeat reQuest (HARQ) process identifier (ID) for the CG-PUSCH, a redundancy version (RV) and a new data indicator (NDI) for the CG-PUSCH.

Embodiment D1. A method implemented in a wireless device (WD), the method comprising:

optionally, receiving a configured grant for a physical uplink shared channel (CG-PUSCH); and causing the radio interface to transmit a configured grant uplink control information (CG-UCI) message on the CG-PUSCH according to at least one predetermined mapping rule.

Embodiment D2. The method of Embodiment D1, further comprising one or more of:

rate matching CG-UCI by starting from an immediate next symbol after a demodulation reference signal (DMRS) for the CG-PUSCH;

determining whether the CG-PUSCH at least partially overlaps with a physical uplink control channel (PUCCH);

if the CG-PUSCH at least partially overlaps with the PUCCH, mapping uplink control information for the PUCCH into the CG-PUSCH;

if the CG-PUSCH at least partially overlaps with the PUCCH, mapping Hybrid Automatic Repeat reQuest bits for the PUCCH into the CG-PUSCH; and calculating a number of coded modulation symbols per layer for the CG-UCI message independent of a length of the CG-PUSCH.

Embodiment D3. The method of any one of Embodiments D1 and D2, wherein the CG-UCI comprises at least one of a Hybrid Automatic Repeat reQuest (HARQ) process identifier (ID) for the PUSCH, a redundancy version (RV) and a new data indicator (NDI) for the PUSCH.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| ACK/NACK | Acknowledgment/Not-acknowledgment |
| CSI | Channel State Information |
| DCI | Downlink Control Information |
| DM-RS | Demodulation Reference Signal |
| PRS | Paging reference symbol |
| TRS | Tracking reference symbol |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, the method comprising:
   receiving, from a network node, downlink control information for a configured grant physical uplink shared channel (CG-PUSCH);
   receiving signaling from the network node indicating whether multiplexing of configured grant uplink control information (CG-UCI) on the CG-PUSCH with other UCI is allowed; and
   transmitting the CG-UCI on the CG-PUSCH, the CG-UCI being mapped to the CG-PUSCH based at least in part on a presence of at least one Hybrid Automatic Repeat reQuest-acknowledgement (HARQ-ACK).

2. The method of claim 1, wherein the downlink control information corresponds to one of a configured grant Type 1 and a configured grant Type 2.

3. The method of claim 1, wherein the CG-UCI corresponds to uplink control information related to decoding uplink shared channel (UL-SCH), that is transmitted on a configured grant resource corresponding to the CG-PUSCH, and the at least one HARQ-ACK corresponds to at least one acknowledgement/non-acknowledgment for at least one downlink (DL) transmission.

4. The method of claim 1, wherein the CG-UCI comprises at least one of a HARQ process identifier (ID), for the CG-PUSCH, a redundancy version (RV) for the CG-PUSCH and a new data indicator (NDI) for the CG-PUSCH.

5. The method of claim 1, wherein the signaling is received via one of radio resource control (RRC) signaling and physical downlink control channel (PDCCH) signaling.

6. The method of claim 1, further comprising:
if the received signaling indicates that multiplexing is allowed, multiplexing the CG-UCI bits with bits of the other UCI.

7. The method of claim 1, wherein the other uplink control information bits include at least one of HARQ-ACK bits and channel state information (CSI) bits.

8. The method of claim 1, wherein the downlink control information includes at least one of radio resource control (RRC) signaling and downlink control information (DCI) signaling.

9. The method of claim 1, further comprising one of:
when at least one HARQ-ACK is to be transmitted in the CG-PUSCH, mapping the CG-UCI to the CG-PUSCH as separate from the at least one HARQ-ACK, and transmitting the CG-UCI on the CG-PUSCH as separate from the at least one HARQ-ACK.

10. The method of claim 1, further comprising one of:
when at least one HARQ-ACK is not to be transmitted in the CG-PUSCH, mapping the CG-UCI to an immediate next orthogonal frequency division multiplexing (OFDM) symbol after a first demodulation reference signal (DMRS) for the CG-PUSCH.

11. The method of claim 10, wherein the CG-UCI has a same priority as a HARQ-ACK uplink control information, UCI.

12. The method of claim 1, further comprising:
determining, $Q'_{CG-UCI}$, a number of coded modulation symbols per layer for a CG-UCI transmission on the CG-PUSCH with an uplink shared channel (UL-SCH) and without the HARQ-ACK according to:

$$Q'_{CG-UCI} = \min\left\{\left\lceil\frac{(O_{CG-UCI} + L_{CG-UCI}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r}\right\rceil, \left\lceil\alpha \cdot \sum_{l=l_0}^{N^{PUSCH}_{symb,all}-1} M^{UCI}_{sc}(l)\right\rceil\right\},$$

wherein,
$O_{CG-UCI}$ represents a number of bits for the CG-UCI;
$L_{CG-UCI}$ represents a number of cyclic redundancy check (CRC) bits for the CG-UCI;
$\beta^{PUSCH}_{offset}$ represents an offset value that is a same value that is configured for the HARQ-ACK;
$C_{UL-SCH}$ represents a number of code blocks for the UL-SCH;
$K_{r=0}$ or $K_r$ represents an r-th code block size for the UL-SCH of the CG-PUSCH transmission;
$M^{PUSCH}_{sc}$ represents a scheduled bandwidth of the CG-PUSCH transmission, expressed as a number of subcarriers;
$M^{PT-RS}_{sc}(l)$ represents a number of subcarriers in orthogonal frequency-division multiplexed (OFDM) symbol l that carries a phase tracking reference signal (PTRS) in the PUSCH transmission;
$M^{UCI}_{sc}(l)$ represents a number of resource elements that can be used for transmission of uplink control information, UCI, in the OFDM symbol l, for l=0, 1, 2, ..., $N^{PUSCH}_{symb,all}-1$, in the CG-PUSCH transmission and $N^{PUSCH}_{symb,all}$ is a total number of OFDM symbols of the CG-PUSCH, including all OFDM symbols used for a demodulation reference signal (DMRS);
for any OFDM symbol that carries DMRS of the PUSCH, $M^{UCI}_{sc}(l)=0$;
for any OFDM symbol that does not carry DMRS of the PUSCH, $M^{UCI}_{sc}(l)=M^{PT-RS}_{sc}(l)$;
α is configured by higher layer parameter scaling; and
$l_0$ represents a symbol index of a first OFDM symbol that does not carry DMRS of the CG-PUSCH, after first DMRS symbols, in the CG-PUSCH transmission.

13. The method of claim 1, further comprising:
determining, $Q'_{ACK}$, a number of coded modulation symbols per layer for a HARQ-ACK transmission on the CG-PUSCH with an uplink shared channel (UL-SCH), and with the HARQ-ACK using at least: $O_{ACK}$=a number of bits for the CG-UCI+a number of the HARQ-ACK bits.

14. The method of claim 1, further comprising:
determining, $Q'_{ACK}$, a number of coded modulation symbols per layer for a transmission on the CG-PUSCH with an uplink shared channel (UL-SCH) and without the HARQ-ACK using at least: $O_{ACK}=O_{CG-UCI}$, $O_{CG-UCI}$ representing a number of bits for the CG-UCI.

15. The method of claim 1, wherein receiving the CG-UCI further comprises:
if the transmitted signaling indicates that multiplexing is allowed, receiving the CG-UCI bits as multiplexed with bits of the other UCI.

16. A method implemented by a network node configured to communicate with a wireless device, the method comprising:
transmitting downlink control information for a configured grant physical uplink shared channel (CG-PUSCH);
transmitting signaling indicating whether multiplexing of configured grant uplink control information (CG-UCI) on the CG-PUSCH with other UCI is allowed; and
receiving the CG-UCI on the CG-PUSCH, the CG-UCI being mapped to the CG-PUSCH based at least in part on a presence of at least one Hybrid Automatic Repeat reQuest-acknowledgement (HARQ-ACK).

17. The method of claim 16, wherein transmitting further comprises:
transmitting via one of radio resource control (RRC) signaling and physical downlink control channel (PDCCH) signaling.

18. The method of claim 16, wherein receiving the CG-UCI further comprises, when at least one HARQ-ACK is not to be transmitted in the CG-PUSCH, receiving the CG-UCI starting from an immediate next orthogonal frequency division multiplexing (OFDM) symbol after a first demodulation reference signal (DMRS) for the CG-PUSCH.

19. A wireless device configured to communicate with a network node, the wireless device comprising processing circuitry, the processing circuitry-configured to cause the wireless device to:
receive, from the network node, downlink control information for a configured grant physical uplink shared channel (CG-PUSCH);
receive signaling from the network node indicating whether multiplexing of configured grant uplink control information (CG-UCI) on the CG-PUSCH with other UCI is allowed; and transmit the CG-UCI on the CG-PUSCH, the CG-UCI being mapped to the CG-PUSCH based at least in part on a presence of at least one Hybrid Automatic Repeat reQuest-acknowledgement (HARQ-ACK).

20. The wireless device of claim 19, wherein the downlink control information corresponds to one of a configured grant Type 1 and a configured grant Type 2.

21. A network node configured to communicate with a wireless device, the network node comprising processing circuitry, the processing circuitry configured to cause the network node to:
   transmit downlink control information for a configured grant physical uplink shared channel (CG-PUSCH);
   transmit signaling indicating whether multiplexing of configured grant uplink control information (CG-UCI) on the CG-PUSCH with other UCI is allowed; and
   receive the CG-UCI on the CG-PUSCH, the CG-UCI being mapped to the CG-PUSCH based at least in part on a presence of at least one Hybrid Automatic Repeat reQuest-acknowledgement (HARQ-ACK).

22. The network node of claim 21, wherein the downlink control information corresponds to one of a configured grant Type and a configured grant Type 2.

\* \* \* \* \*